US008351989B2

(12) United States Patent
Ahn et al.

(10) Patent No.: US 8,351,989 B2
(45) Date of Patent: Jan. 8, 2013

(54) METHOD OF DISPLAYING MENU IN A MOBILE COMMUNICATION TERMINAL

(75) Inventors: Hye Sang Ahn, Seoul (KR); Hwi Mun Cho, Seoul (KR); Jun Serk Park, Seoul (KR); Kye Sook Jeong, Seoul (KR); Mee Yeon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1041 days.

(21) Appl. No.: 12/031,685

(22) Filed: Feb. 14, 2008

(65) Prior Publication Data

US 2008/0207188 A1 Aug. 28, 2008

(30) Foreign Application Priority Data

Feb. 23, 2007 (KR) .................. 10-2007-0018175
Apr. 4, 2007 (KR) .................. 10-2007-0033308
May 3, 2007 (KR) .................. 10-2007-0043087

(51) Int. Cl.
*H04B 1/38* (2006.01)
(52) U.S. Cl. ........ 455/566; 715/767; 715/810; 715/818; 715/829; 715/845; 709/217; 455/418
(58) Field of Classification Search .................. 455/566, 455/418; 715/767, 810–845; 34/173; 709/217; 345/473
See application file for complete search history.

(56) References Cited

U.S. PATENT DOCUMENTS

| 2002/0123368 | A1 | 9/2002 | Yamadera et al. |
| 2005/0026657 | A1 | 2/2005 | Hasegawa et al. |
| 2005/0257170 | A1* | 11/2005 | Kim et al. .................. 715/825 |
| 2006/0143574 | A1 | 6/2006 | Ito et al. |
| 2006/0190833 | A1* | 8/2006 | SanGiovanni et al. ....... 715/767 |
| 2007/0174415 | A1* | 7/2007 | Cha et al. .................. 709/217 |
| 2007/0240073 | A1* | 10/2007 | McCarthy et al. ............ 715/767 |
| 2008/0052945 | A1* | 3/2008 | Matas et al. .................. 34/173 |
| 2008/0194242 | A1* | 8/2008 | Park et al. .................. 455/418 |

FOREIGN PATENT DOCUMENTS

CN 1617553 5/2005

OTHER PUBLICATIONS

European Patent Office Application Serial No. 081018325.0, Search Report dated Nov. 14, 2012, 6 pages.

* cited by examiner

*Primary Examiner* — Charles Appiah
*Assistant Examiner* — Alexander Yi
(74) *Attorney, Agent, or Firm* — Lee, Hong, Degerman, Kang & Waimey

(57) ABSTRACT

A method of displaying a menu in a mobile communication terminal and a mobile communication terminal are provided. The method of displaying a menu in a mobile communication terminal comprises displaying a standby screen in a display of the mobile communication terminal, selecting one of a plurality of specific directions through an input device of the mobile communication terminal, and displaying each menu corresponding to the selected specific direction on the standby screen.

20 Claims, 33 Drawing Sheets

METHOD OF DISPLAYING MENU IN A MOBILE COMMUNICATION TERMINAL

CROSS REFERENCE TO RELATED APPLICATIONS

This Pursuant to 35 U.S.C. §119(a), this application claims the benefit of earlier filing date and right of priority to Korean Patent Application Nos. 10-2007-0018175, filed on Feb. 23, 2007, 10-2007-0033308, filed on Apr. 4, 2007, and 10-2007-0043087, filed on May 3, 2007, the entire contents of which are all hereby incorporated by reference herein.

FIELD OF THE INVENTION

This document relates to a method of displaying a menu in a mobile communication terminal.

RELATED ART

In a mobile communication terminal, if a specific button is selected on a standby screen, the standby screen disappears and a menu screen corresponding to the specific button is displayed.

When a menu list or a file list is displayed, device characteristics of the touch input device are not considered available. Methods and systems are needed to overcome the above-noted shortcomings.

BRIEF DESCRIPTION OF THE DRAWINGS

The details of one or more implementations are set forth in the accompanying drawings and the description below. Like reference numerals represent corresponding parts throughout various figures.

Hereinafter, implementations of this document will be described in detail with reference to the accompanying drawings.

DETAILED DESCRIPTION OF THE PREFERRED EMBODIMENTS

Figure 1:
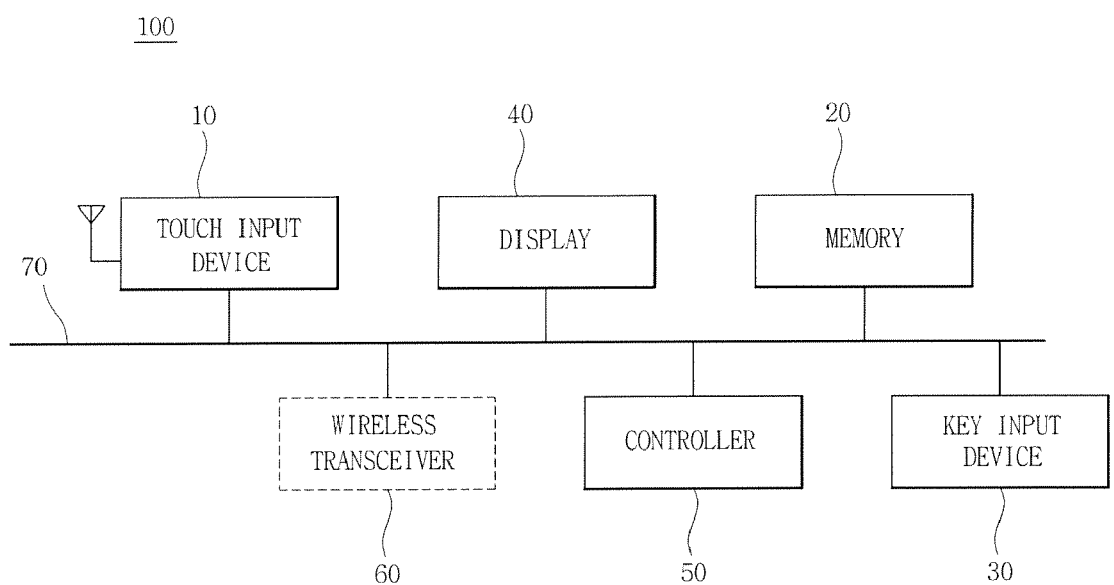
FIG. 1 is a block diagram illustrating a configuration of a mobile communication terminal in an implementation.

Referring to FIG. 1, a mobile communication terminal 100 may comprise a touch input device 10, a memory 20, a key input device 30, a display 40, a controller 50, and a wireless transceiver 60. The above-described elements may be connected by a bus 70.

The touch input device 100 is a device in which a user inputs various information or instruction with a touch method. The touch input device 100 comprises, for example, a touch screen or a touch pad.

The memory 20 comprises a program memory and a data memory. Programs for controlling a general operation of the mobile communication terminal 100 are stored in the program memory.

The key input device 30 comprises various buttons for inputting numeral and character information, function buttons for setting various functions, and a direction key for selecting a specific direction.

The display 40 may provide outputs various display information and various menu screens 100, and may comprise a Liquid Crystal Display (LCD) or an Organic Light Emitting Diode (OLED). Further, the display 40 can be embodied with a plurality of displays comprising an external display and an internal display.

The controller 50 controls a general operation of the mobile communication terminal 100. In this implementation, the controller 50 determines when a standby screen is displayed in the display 40, if a specific direction is selected by the touch input device 10 or the key input device 30, to display a menu corresponding to the selected direction on the standby screen.

In this implementation, menus corresponding to the selected direction may comprise a menu related to an icon displayed in an indicator area, a 'my menu' set by the user, a communication provider additional service menu, and a basic setting menu, for example.

Figure 2:
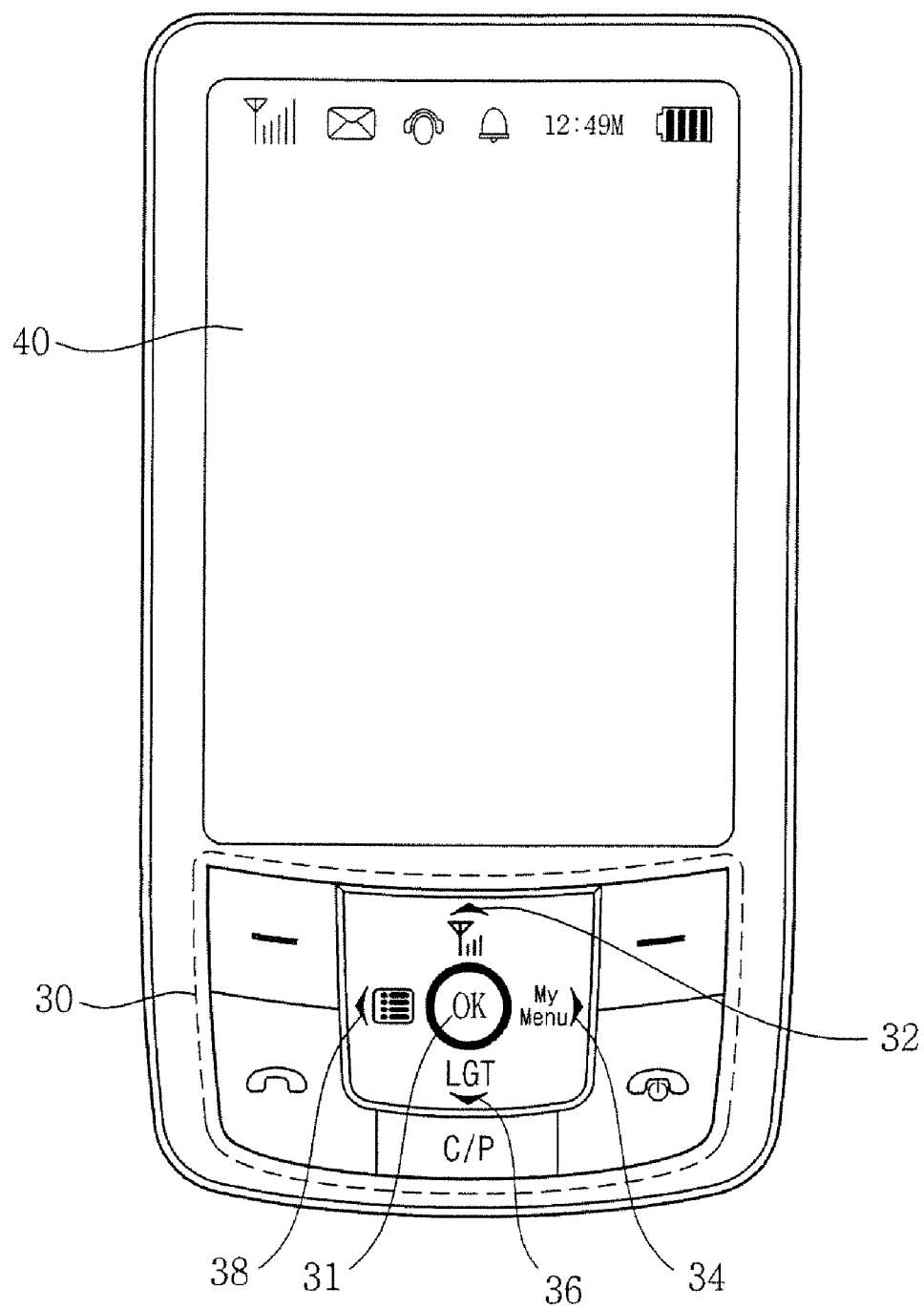
FIG. 2 is a diagram illustrating a key input device and a display of FIG. 1.

Referring to FIG. 2, a key input device 30 comprises four direction keys, i.e. an upward direction key 32, a rightward direction key 34, a downward direction key 36, a leftward direction key 38, and a confirmation (OK) button 31. In this implementation, the four direction keys are used to select a specific direction on a standby screen.

FIGS. 3A to 3E illustrate screens for explaining a method of displaying a menu when an upward motion or direction key is selected in a mobile communication terminal in an implementation.

Figure 3A:
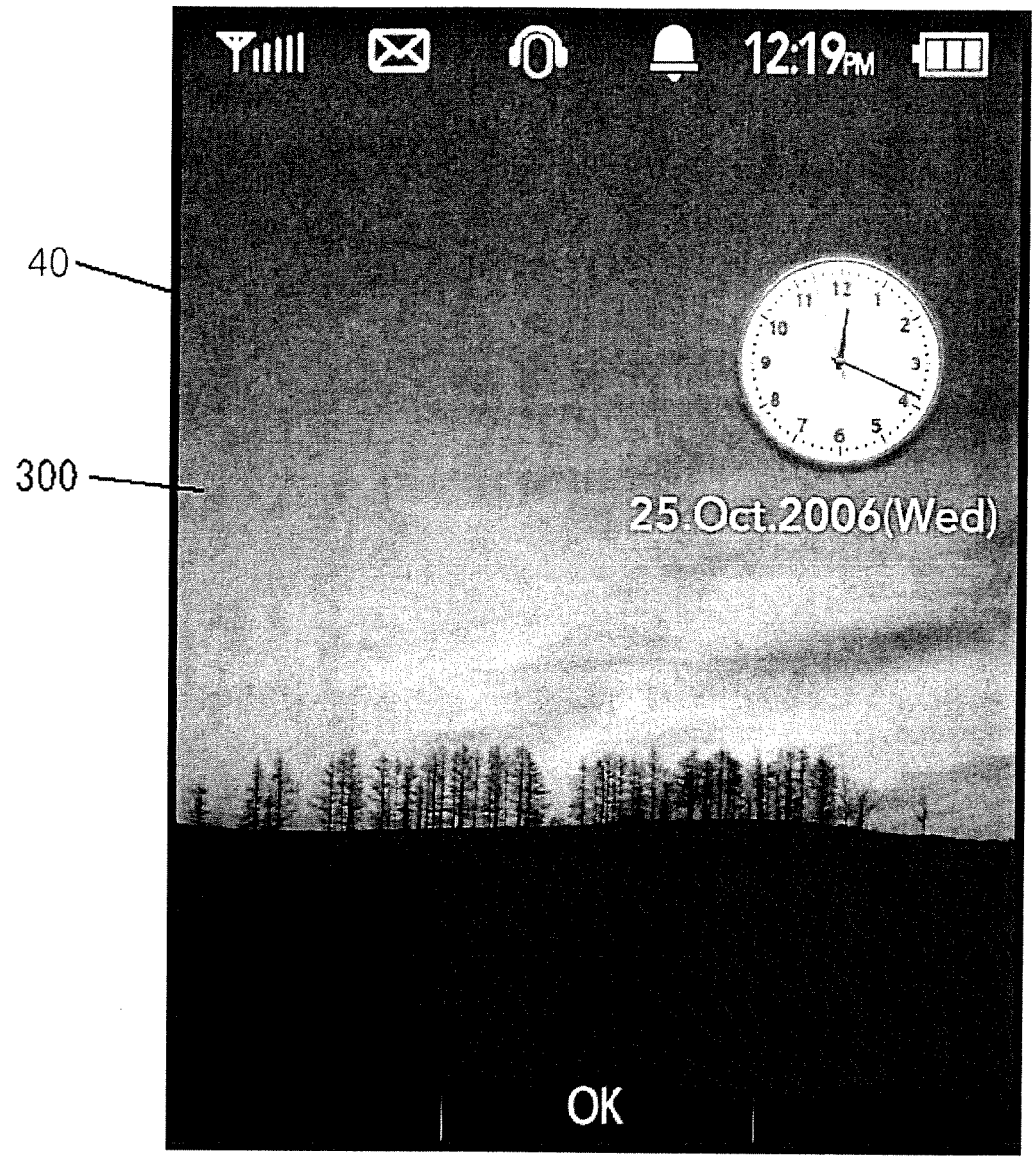
FIGS. 3A to 3E illustrate screens for explaining a method of displaying a menu when an upward direction key is selected in a mobile communication terminal in an implementation.

First, referring to FIG. 3A, a standby screen 300 set by a user is displayed in the display 40 of the mobile communication terminal 100.

Figure 3B:
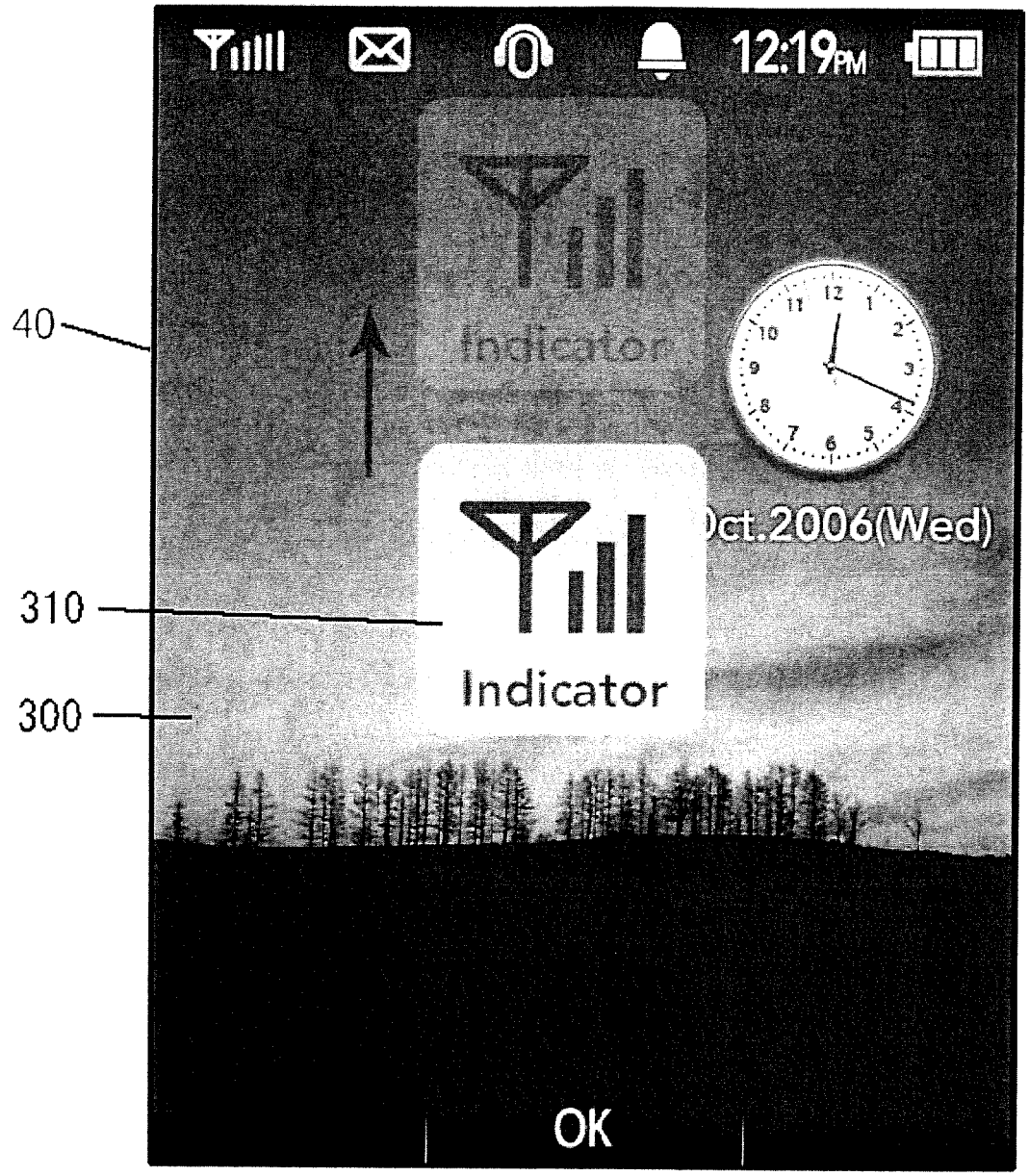

If the user selects the upward direction key 32 from the four direction keys provided in the key input device 30, an icon 310 corresponding to an icon displayed on the upward direction key 32 disappears in the standby screen 300 while moving in an upward direction after being displayed around the center of the standby screen 300, as shown in FIG. 3B.

Figure 3C:
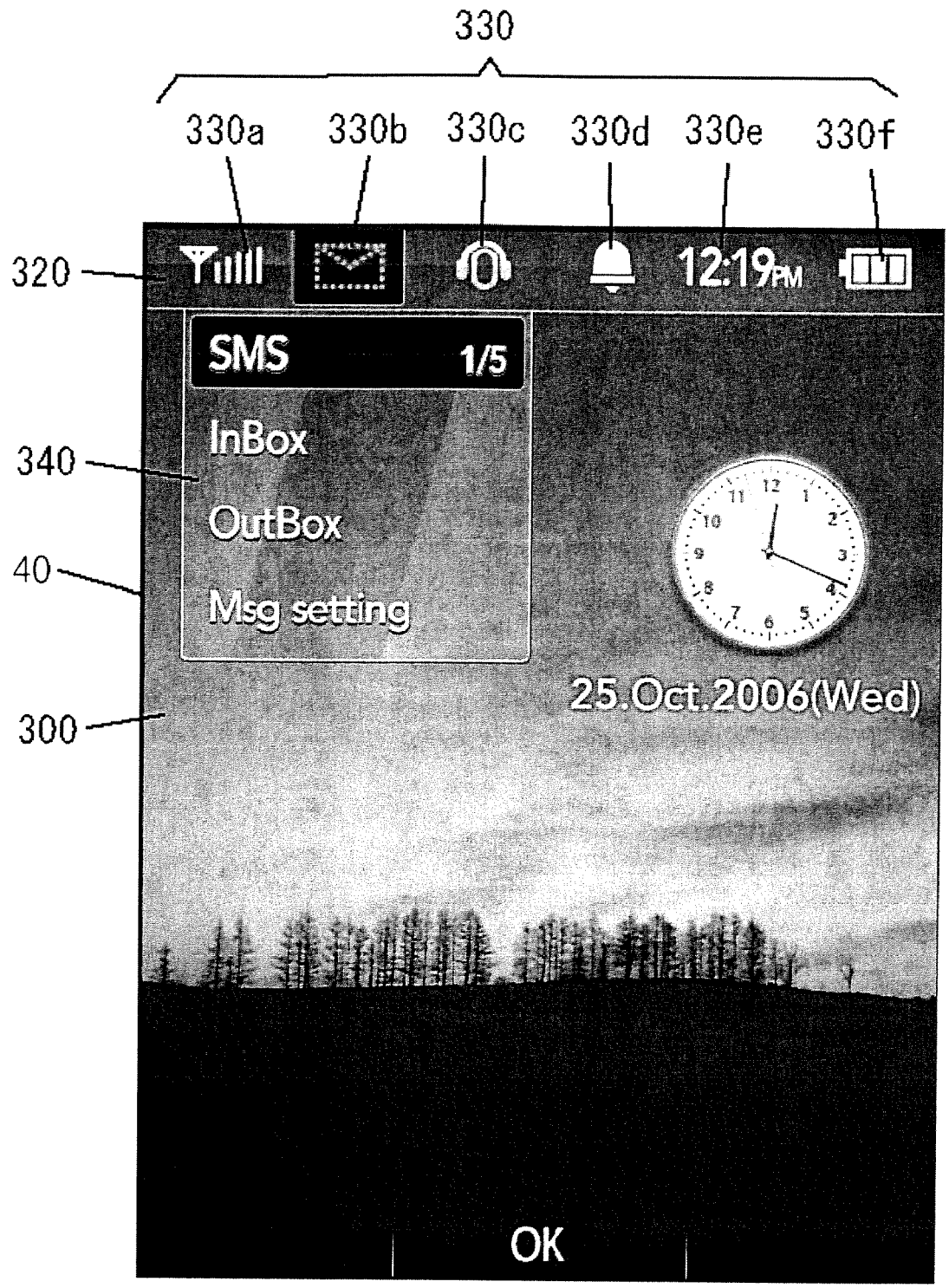

Thereafter, as shown in FIG. 3C, a pop-up menu window 340 related to an icon 330 displayed in the indicator area 320 is transparently displayed. In an implementation, when the user selects the upward direction key 32, the user can directly enter a menu related to the icon 330 displayed in the indicator area 320 on the standby screen 300.

Further, as a pop-up menu window 340 related to the icon 330 is transparently displayed on the standby screen 300, the preset standby screen 300 is not hidden by the pop-up menu window 340 related to the icon 330, whereby the user can directly enter a menu related to the icon 330 while viewing the standby screen 300 in a standby screen state.

In FIG. 3C, the icon 330 displayed in the indicator area 320 comprises a signal intensity icon 330a, a message notification icon 330b, a background music setting icon 330c, a reception mode setting icon 330d, a watch icon 330e, and a battery residual quantity display icon 300f, for example. In addition to the above-described icons, various icons can be displayed in the indicator area 320 on the standby screen 300, depending on implementation.

In general, the signal intensity icon 330a, the reception mode setting icon 330d, the watch icon 330e, and the battery residual quantity display icon 330f may be displayed in the indicator area 320. In one embodiment, the message notification icon 330b is displayed in the indicator area 320 if a message arrives, and the background music setting icon 330d is displayed in the indicator area 320 if music is being played.

In FIG. 3C, the pop-up menu window 340 related to the message notification icon 330b is transparently displayed. For example, a cursor is positioned at a Short Message Service (SMS) menu, which is a first sub-menu of the pop-up menu window 340 related to the message notification icon 330b.

Further, the message notification icon 330b in the pop-up menu window 340 may be displayed highlighted in a color different than the icons displayed in the indicator area 320. The user may select a sub-menu among sub-menus in the pop-up menu window 340 by moving the cursor using the upward direction key 32 and the downward direction key 36.

Depending on implementation, the message notification icon 330b may be displayed in a size different from that of other icons or an icon related to a currently displayed menu may be displayed to be easily recognized by the user with other various methods.

Figure 3D:
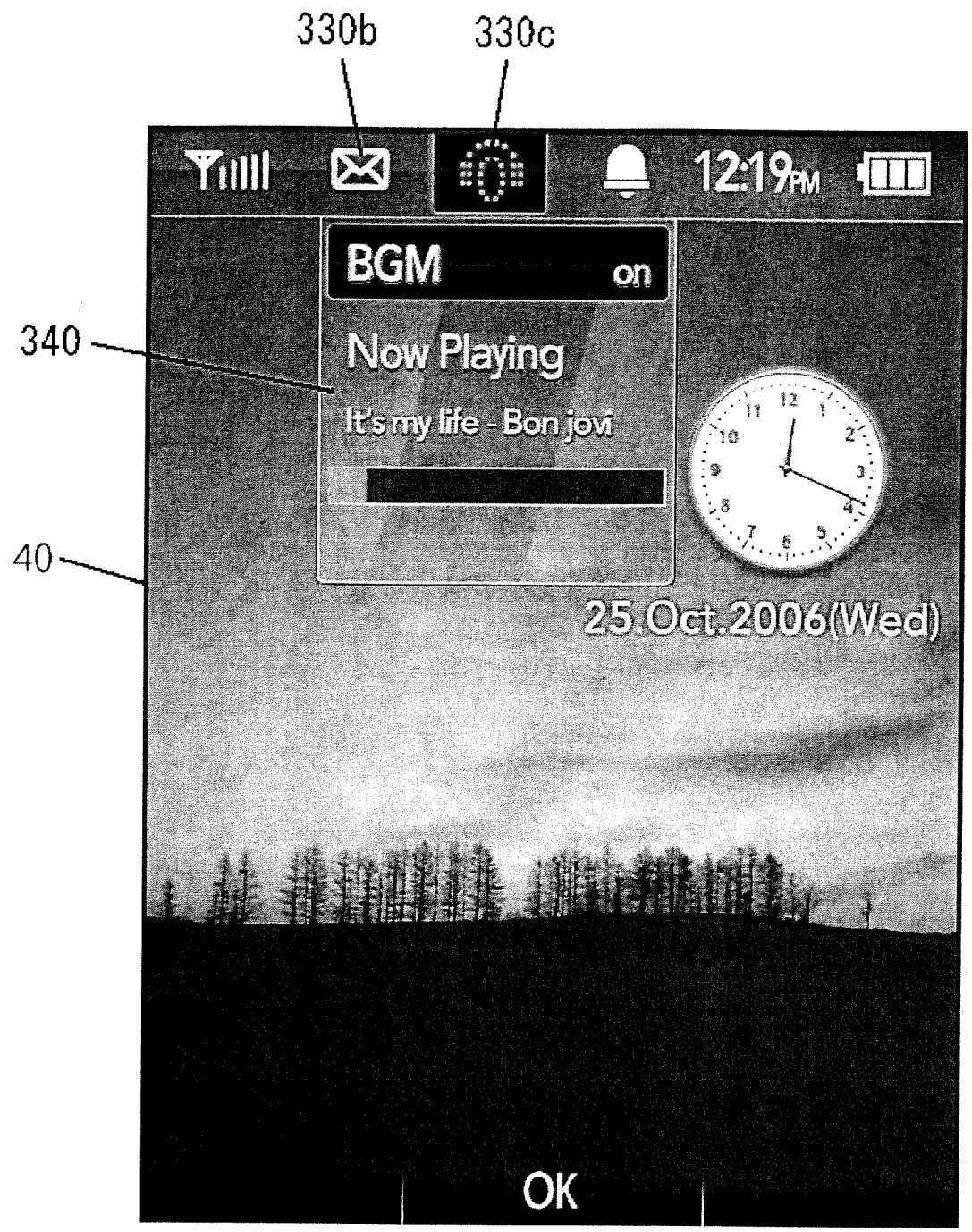

Referring to FIG. 3C, when the pop-up menu window 340 related to the message notification icon 330b is displayed a cursor may be positioned at a sub-menu of a top position among sub-menus of the pop-up menu window 340. If the user clicks the rightward direction key 34, the pop-up menu window 340 related to the background music setting icon 330c positioned at the direct right side of the at the direct right side of the message notification icon 330b is transparently displayed, as shown in FIG. 3D.

In one embodiment, a cursor is moved to a first sub-menu in the pop-up menu window 340 related to the background music icon 330c, the background music icon 330c may be displayed in a color different than those of other icons.

Figure 3E:
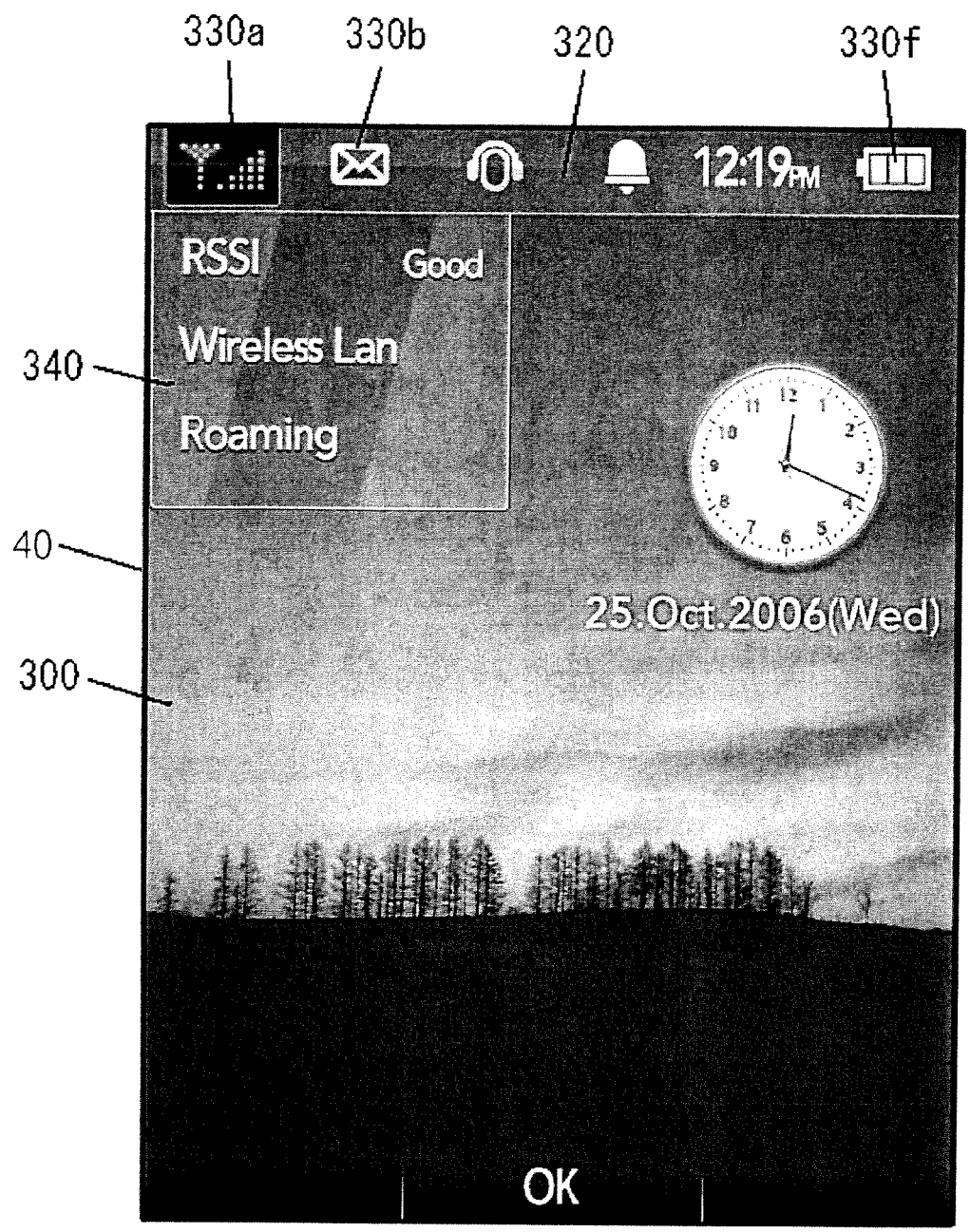

If the user clicks the leftward direction key 38 shown in FIG. 3C, a pop-up menu window 340 related to the signal intensity icon 330a positioned at the direct left side of the message notification icon 330b is transparently displayed, as shown in FIG. 3E. A cursor may not exist in a sub-menu in the pop-up menu window 340 related to the signal intensity icon 330a, and thus the user may not be able to select corresponding sub-menus. This may be true when a pop-up menu window related to the battery residual quantity display icon 330f is displayed.

When the standby screen 300 is displayed in this way, if the user selects the upward direction key 32, the pop-up menu window 340 related to the icon 330 displayed in the indicator area 320 is transparently displayed. Therefore, the user can enter menus related to the icon 330 displayed in the indicator area 320 when the standby screen 300 is displayed without separate menu manipulation.

Figure 4A:
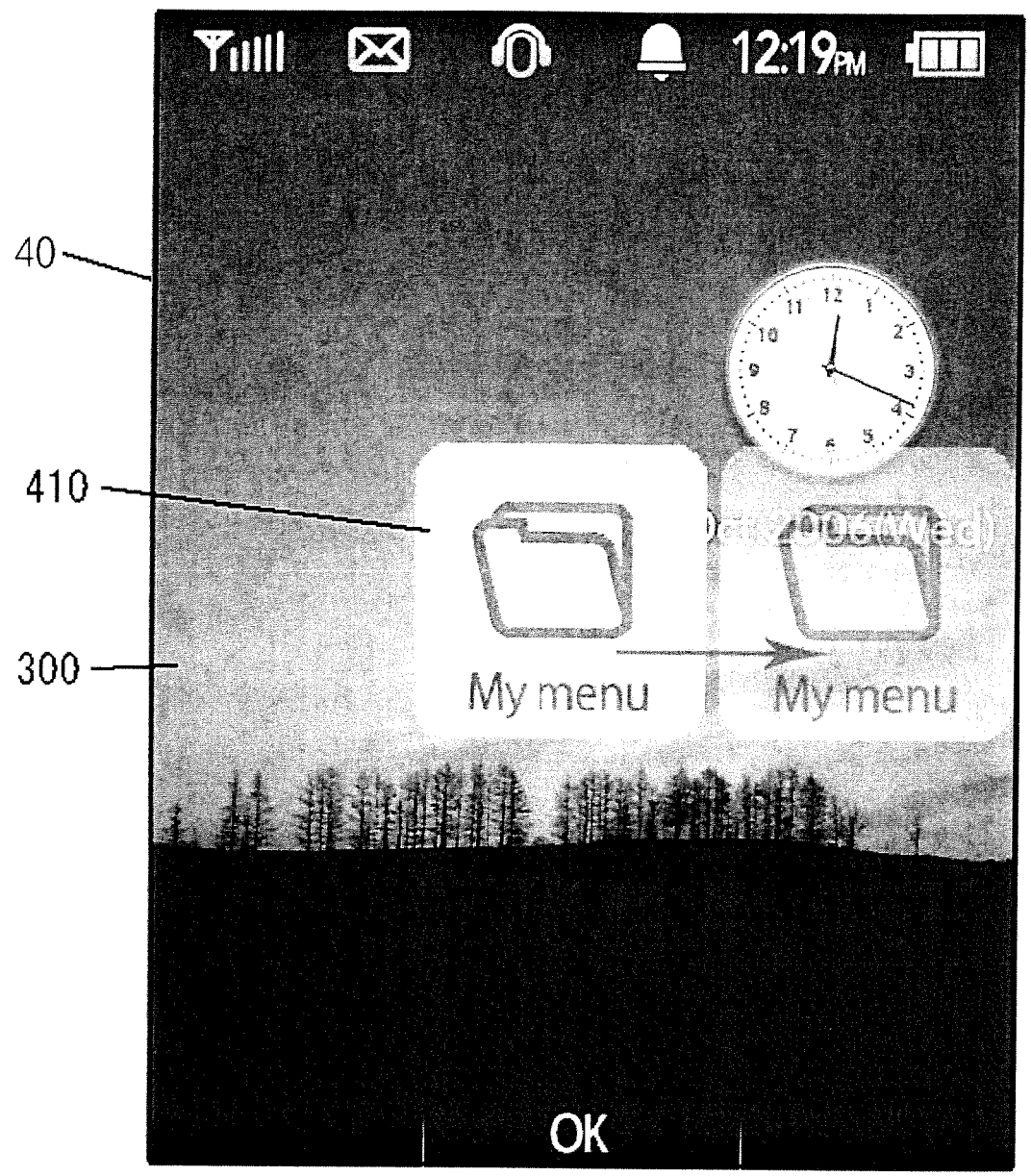
FIGS. 4A and 4B illustrate screens for explaining a method of displaying a menu when a rightward direction key is selected in a mobile communication terminal in an implementation.
Figure 4B:
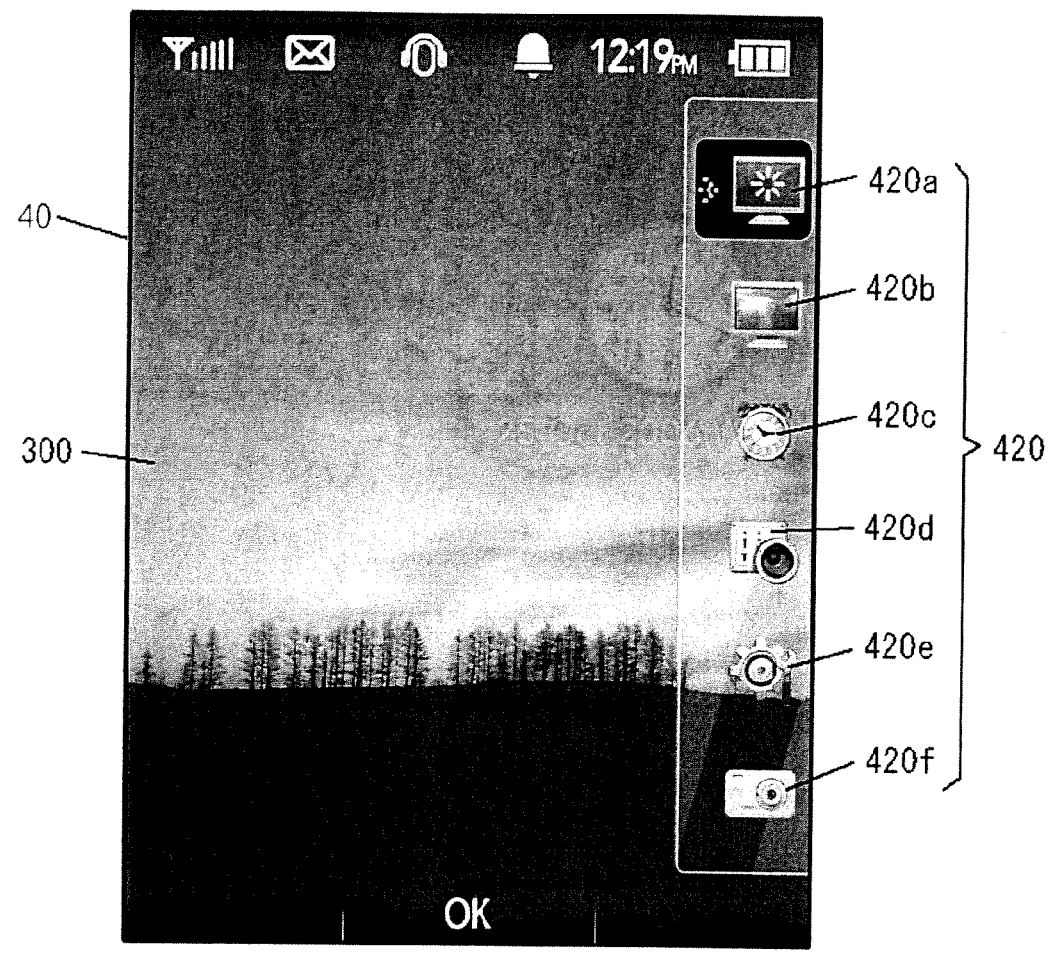

FIGS. 4A and 4B illustrate sample screens for explaining a method of displaying a menu when a rightward direction key is selected in a mobile communication terminal in an implementation.

First, when the standby screen 300 is displayed, as in FIG. 3A, if the user selects the rightward direction key 34 provided in the key input device 30, an icon 410 corresponding to an icon displayed in the rightward direction key 34 disappears on the standby screen 300 while moving to the right side after being displayed around the center of the standby screen 300, as shown in FIG. 4A.

Thereafter, a user menu 420 as shown in FIG. 4B is displayed at the right side of the standby screen 300. The user menu 420 comprises sub-menus set by the user in order for the user to easily enter a menu in which the user frequently uses. In FIG. 4B, the user menu 420 may comprise sub-menus such as a brightness setting menu 420a, a standby screen setting menu 420b, an alarm setting menu 420c, a bell sound setting menu 420d, an initial value setting menu 420e, and a camera menu 420f.

FIGS. 5A to 5D illustrate screens in which each of sub-menus of FIG. 4B are selected.

Figure 5A:
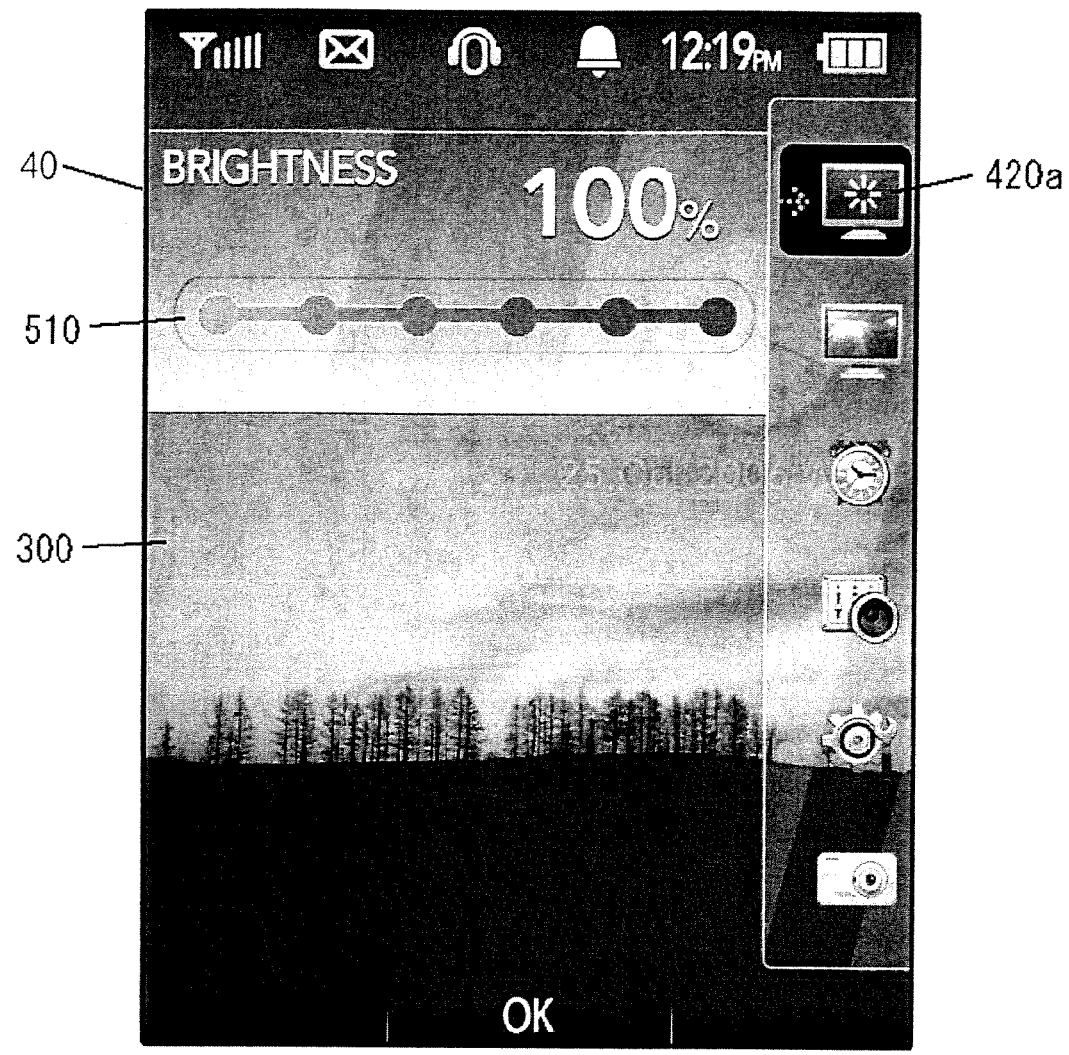
FIGS. 5A to 5D illustrate screens in which one or more sub-menus of FIG. 4B is selected.

Referring to FIG. 5A, when the user selects the brightness setting menu 420a, a brightness setting window 510 for setting brightness is displayed in a transparent window, for example, at the left side of the brightness setting menu 420a. The user can set brightness of various screens displayed on the standby screen 300 using the brightness setting window 510.

Figure 5B:
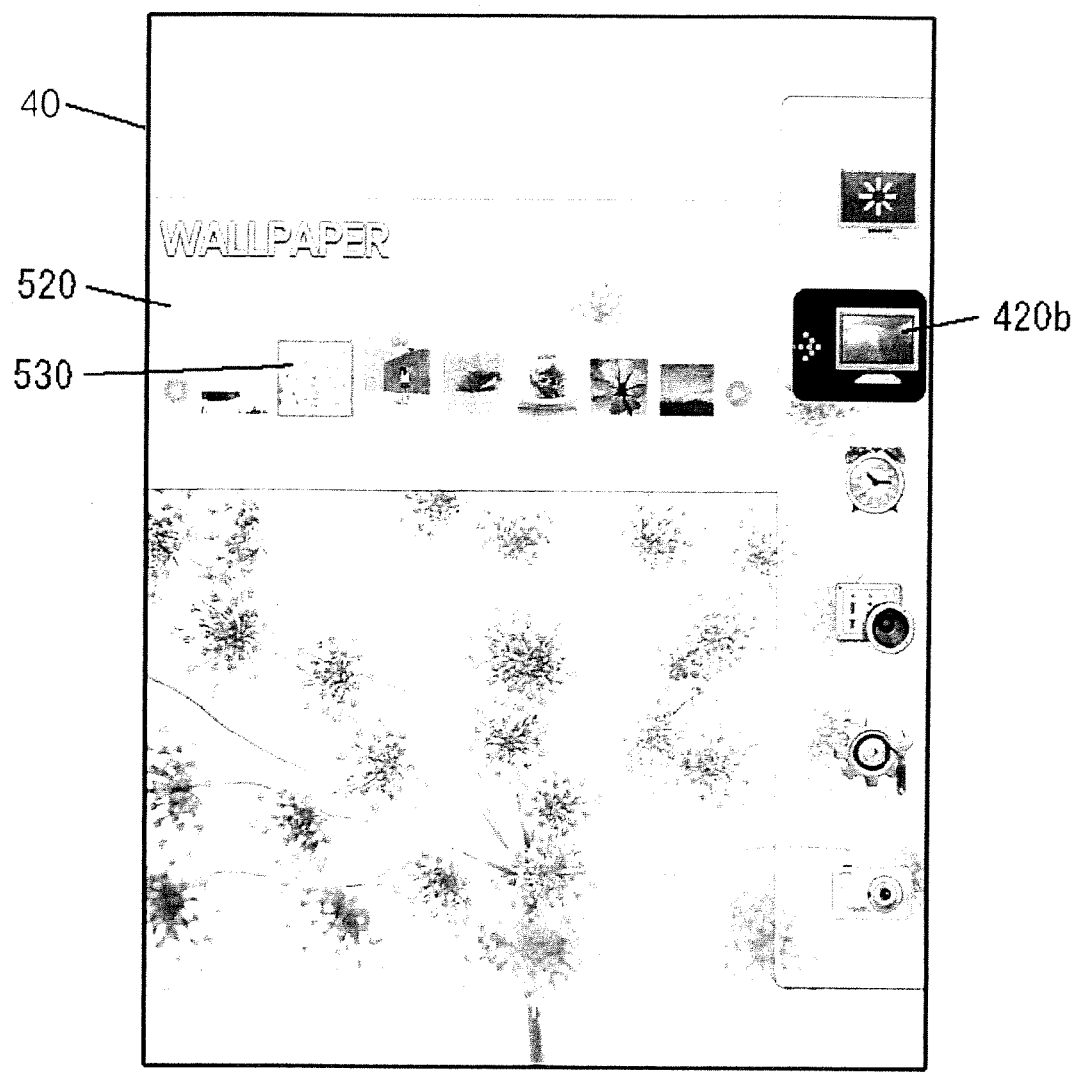

Referring to FIG. 5B, when the user selects the standby screen setting menu 420b, a standby screen setting window 520 for setting a standby screen is displayed in a transparent window, for example, at the left side of the standby screen setting menu 420b.

Standby screens that can be set are provided in a thumbnail image form on the standby screen setting window 520, and the user can move a cursor and set a desired standby screen by manipulating the leftward direction key 38 and the rightward direction key 34. In one embodiment, when the cursor is moved to a specific thumbnail image, a screen corresponding thereto is set as a standby screen.

Figure 5C:
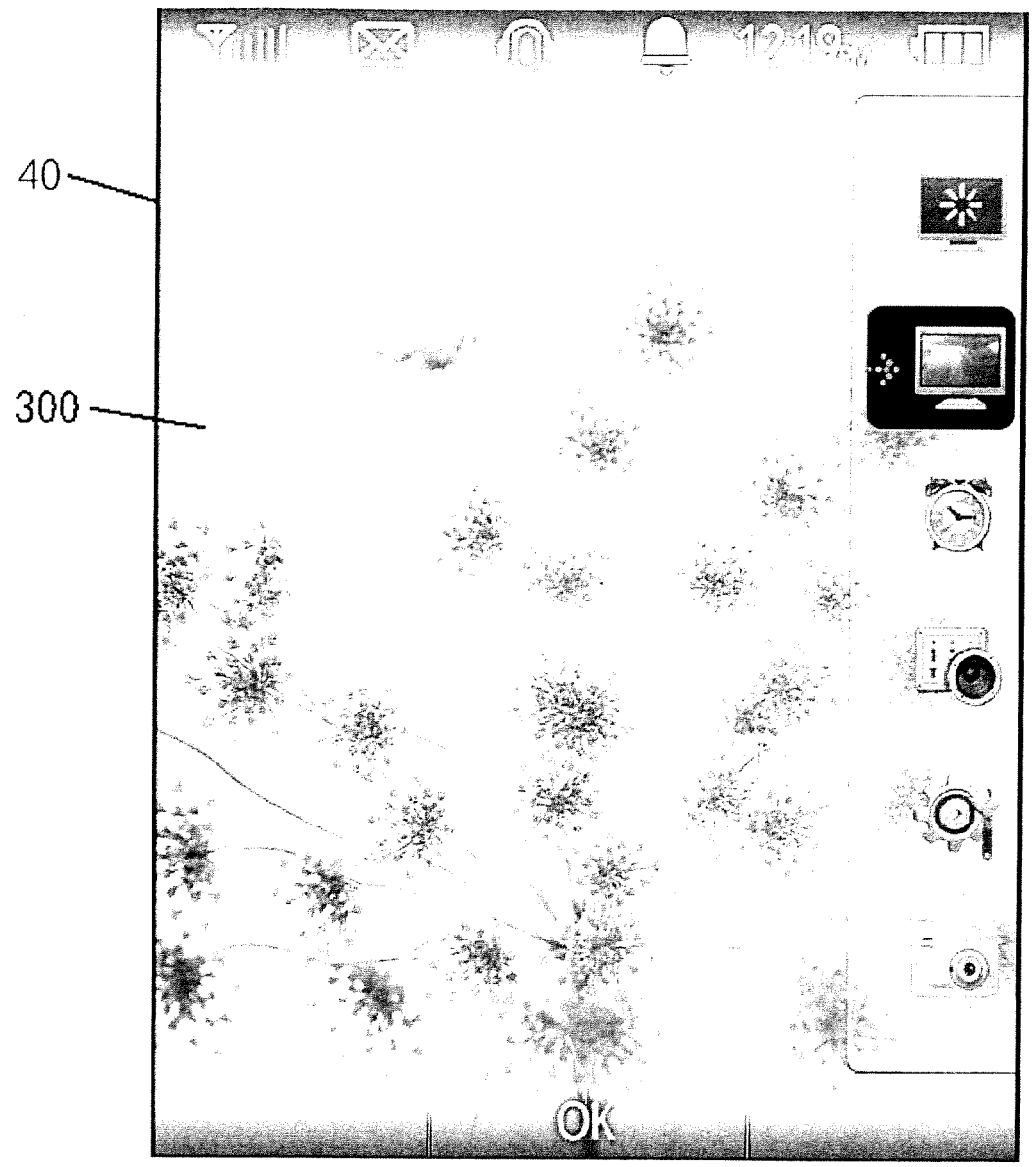

In this implementation, it can be seen that a screen corresponding to a second thumbnail image 530 where the cursor is positioned is set as a standby screen. FIG. 5C shows a case where the user sets a corresponding image as a standby screen by pressing the OK button 31 of the input device 30 in a state of FIG. 5B.

Figure 5D:
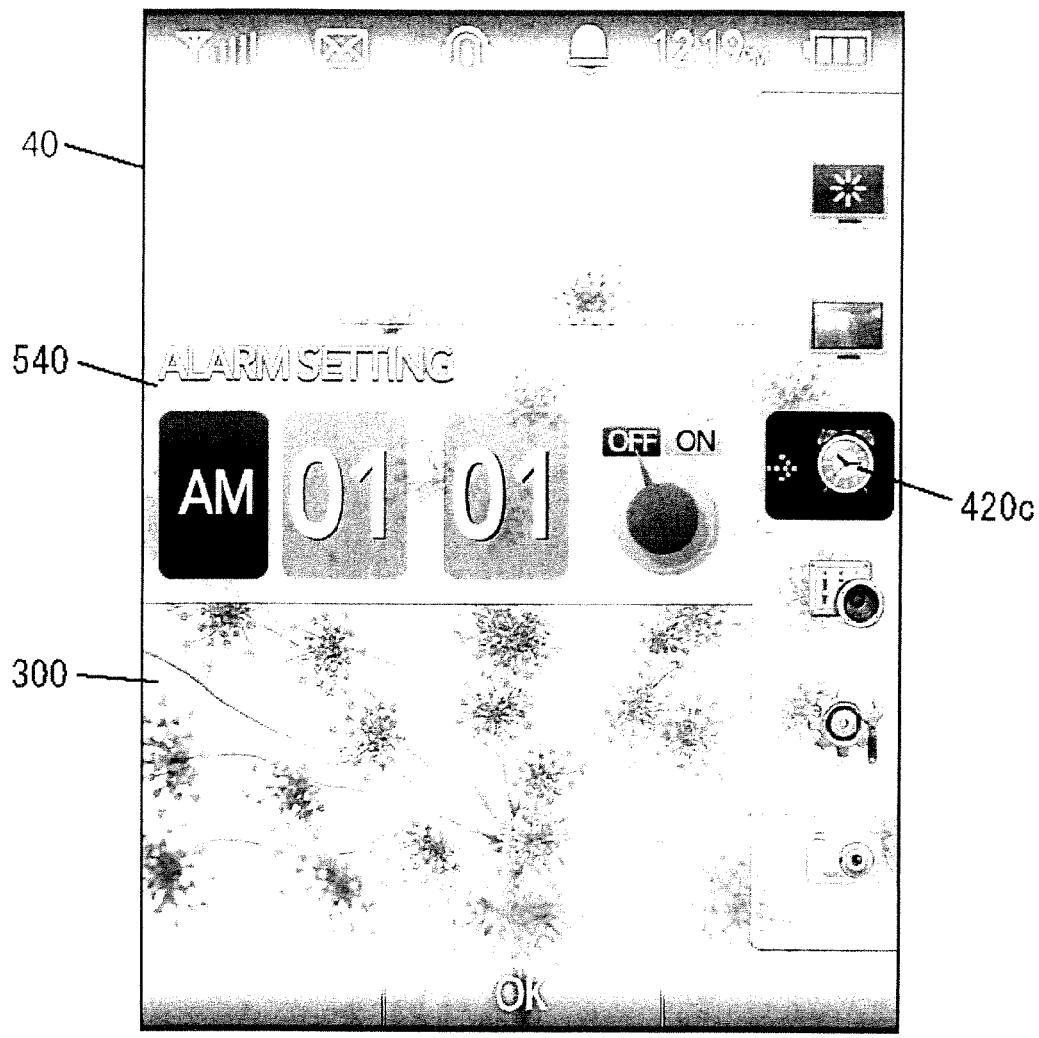

Referring to FIG. 5D, when the user selects the alarm setting menu 420c, an alarm setting window 540 for setting an alarm is displayed in a transparent window, for example, at the left side of the alarm setting menu 420c. The user can easily set an alarm on the standby screen 300 by using the alarm setting window 540.

Figure 6A:
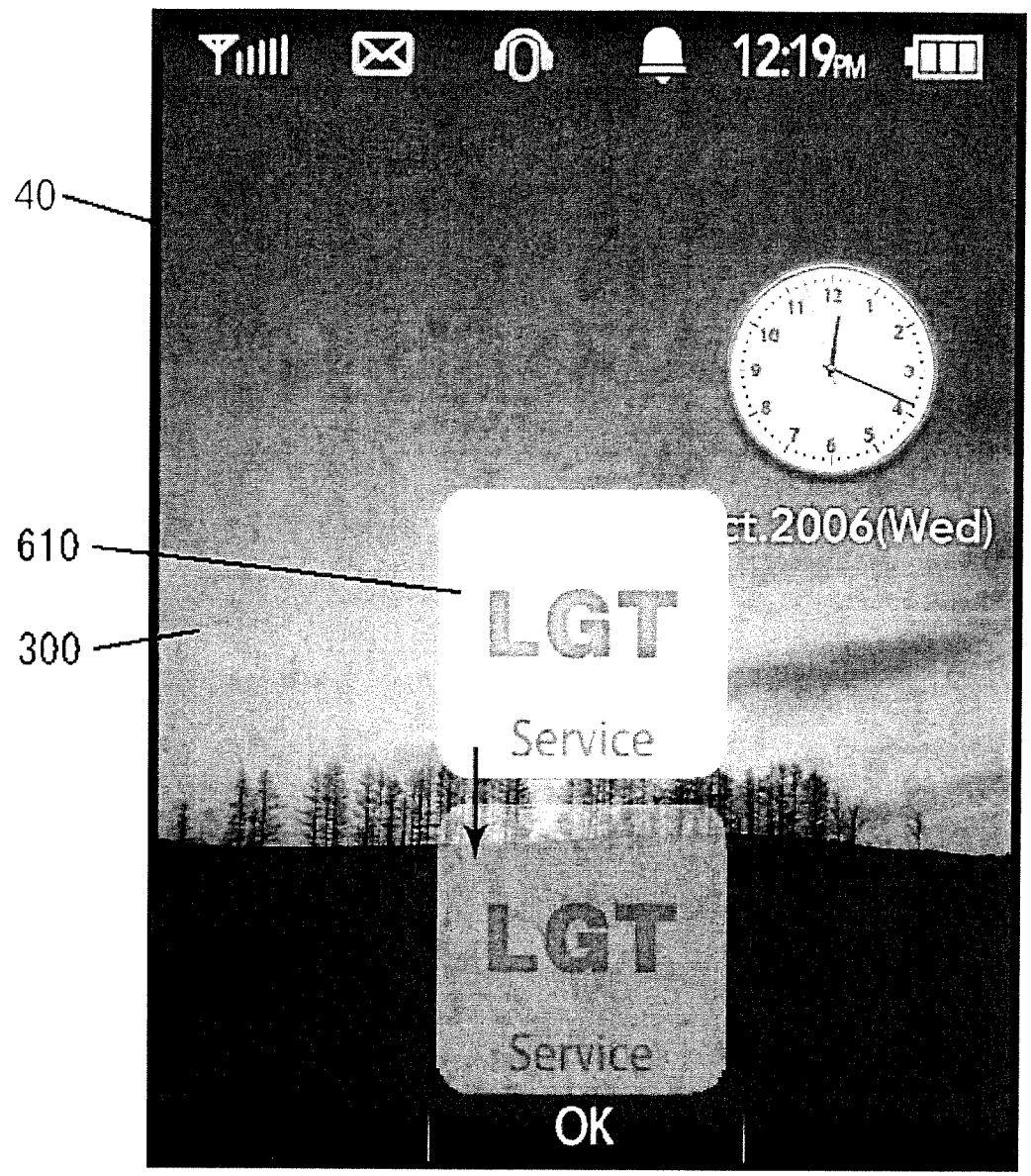
FIGS. 6A and 6B illustrate screens for explaining a method of displaying a menu when a downward direction key is selected in a mobile communication terminal in an implementation.
Figure 6B:
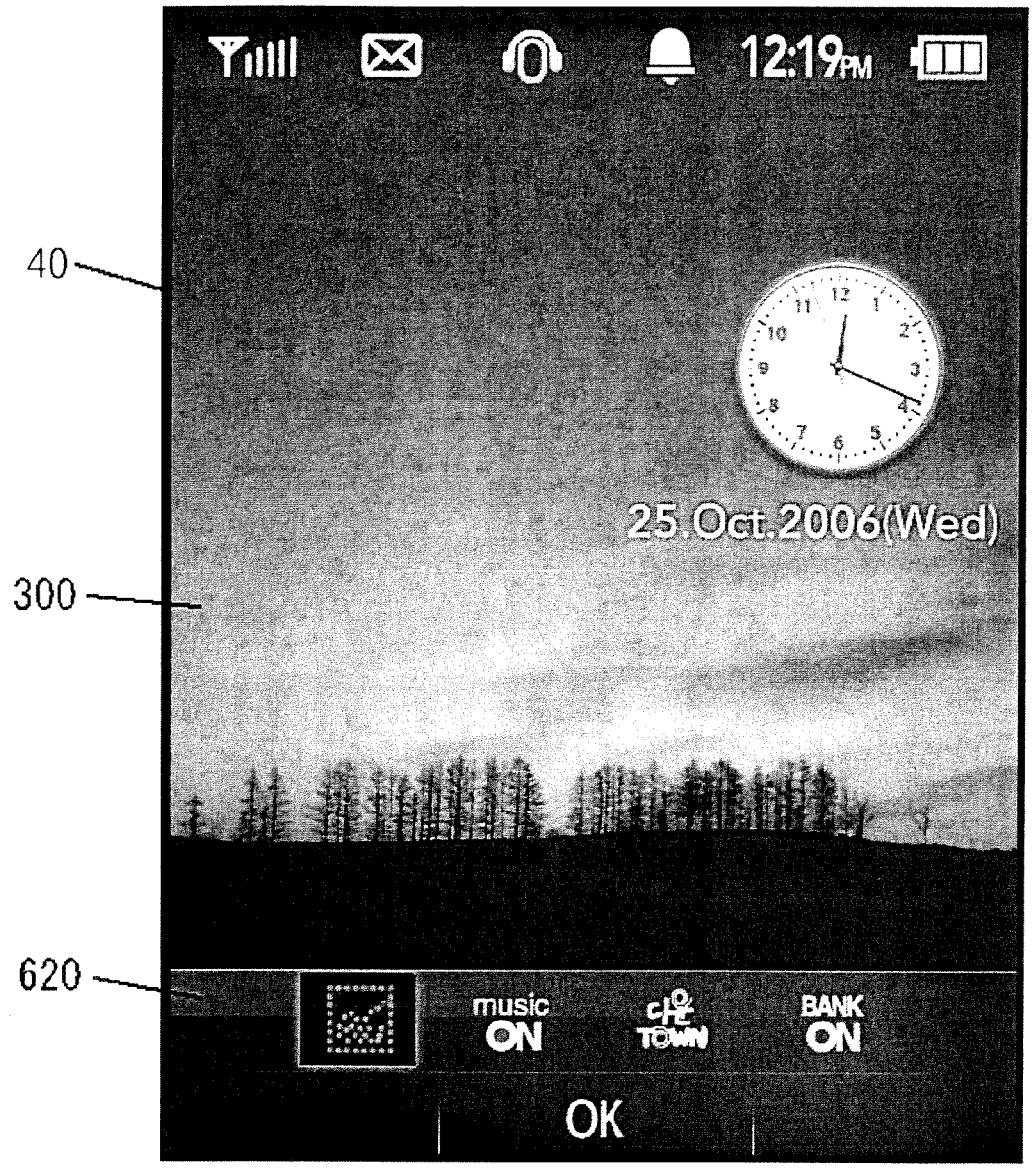

FIGS. 6A and 6B illustrate screens for explaining a method of displaying a menu when a downward direction key is selected in a mobile communication terminal in an implementation.

First, as in FIG. 3A, when the standby screen 300 is displayed, if the user selects the downward direction key 36 of a plurality of direction keys provided in the key input device 30, an icon 610 corresponding to an icon displayed in the downward direction key 36 disappears while moving to a lower direction after being displayed around the center of the standby screen 300, as shown in FIG. 6A.

Thereafter, a communication service provider additional service menu 620 shown in FIG. 6B is transparently displayed on the standby screen 300. In this implementation, a communication service provider is 'LG telecom', however an additional service menu provided by various communication service providers can be included. In this implementation, the additional service menu comprises a 'music service', a 'directory service', a 'bank service' and may comprise other various additional services.

In this implementation, when the standby screen 300 is displayed, if the user selects a downward direction through the key input device 30, a communication service provider additional service menu in which various additional service provided by a communication service provider are included is displayed on the standby screen 300. Therefore, the user can confirm and select additional services which the communication service provider provides on the standby screen 300 through simple manipulation.

Figure 7A:
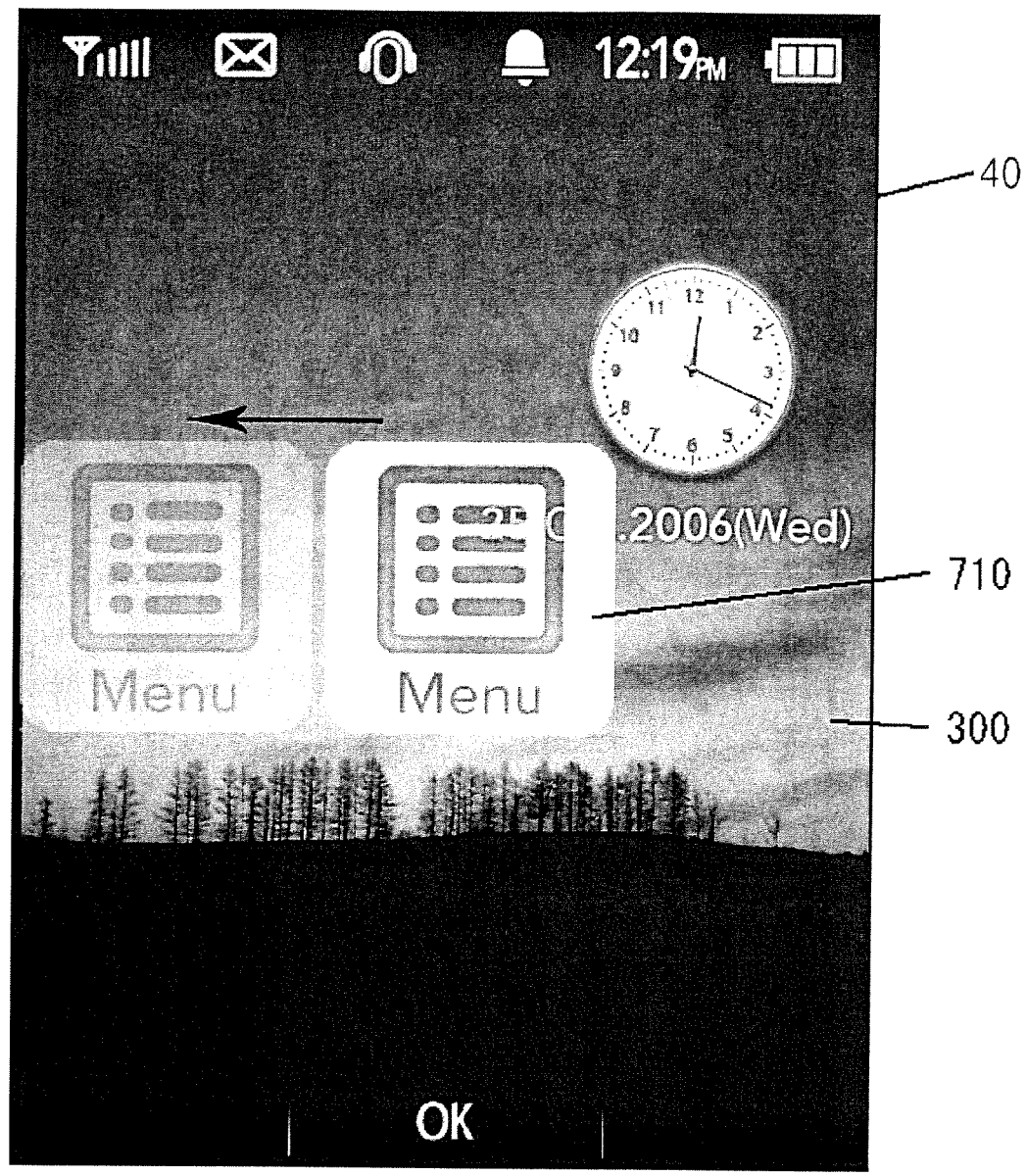
FIGS. 7A to 7C illustrate screens for explaining a method of displaying a menu when a leftward direction key is selected in a mobile communication terminal in an implementation.
Figure 7B:
Figure 7C:
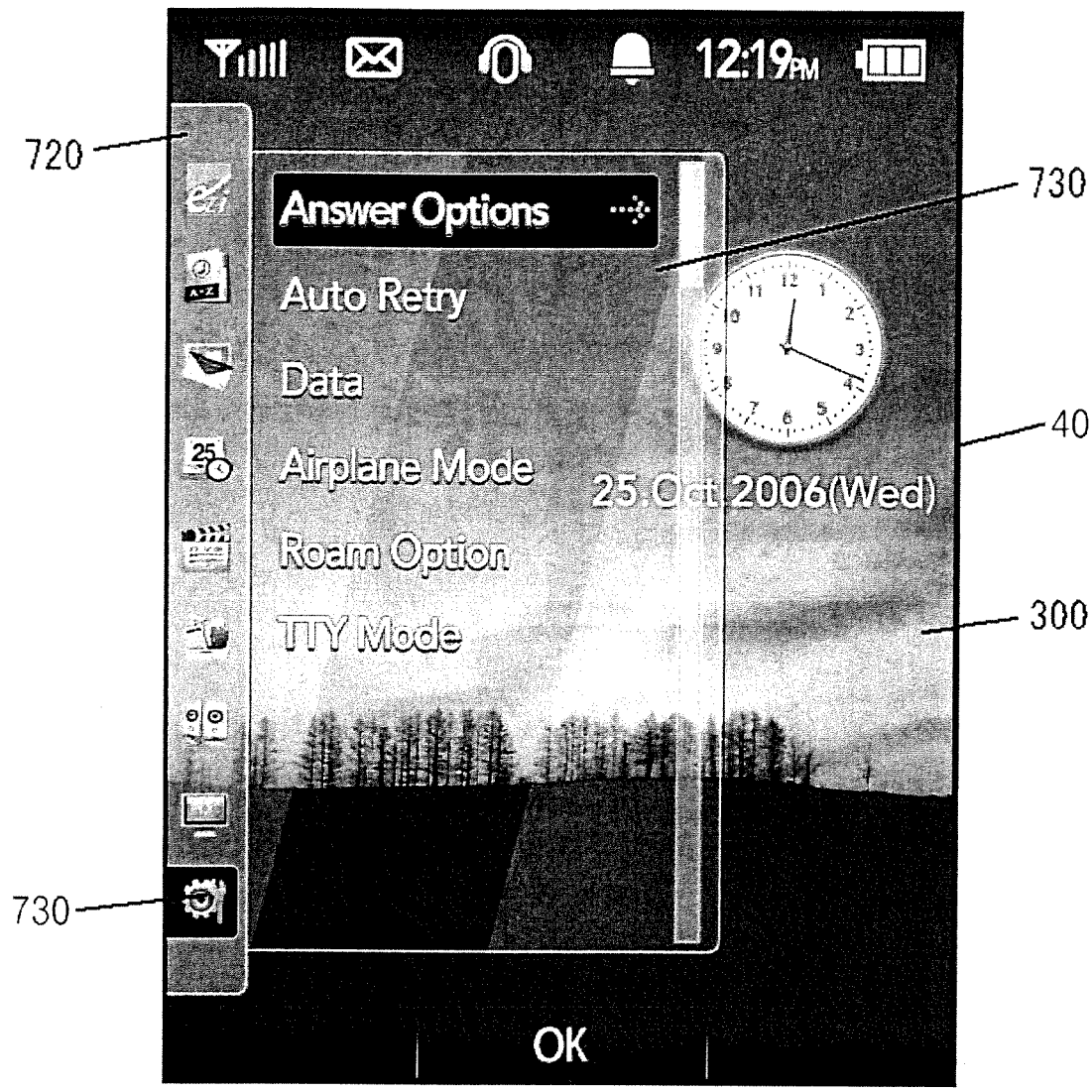

FIGS. 7A to 7C illustrate screens for explaining a method of displaying a menu when a leftward direction key is selected in a mobile communication terminal in implementation.

First, when the standby screen 300 is displayed on the display 40, as in FIG. 3A, if the user selects the leftward direction key 38 of a plurality of direction keys provided in the key input device 30, an icon 710 corresponding to an icon displayed in the leftward direction key 38 disappears while moving to left after being displayed around the center of the standby screen 300, as shown in FIG. 7A.

Thereafter, a basic setting menu list 720 of the mobile communication terminal 100 shown in FIG. 7B is displayed in a transparent window form in a left area of the standby screen 300. The basic setting menu list 720 comprises a plurality of menus, and each menu comprises an icon 730 and a menu name 740 corresponding thereto. A plurality of menus constituting the basic setting menu list 720 are arranged in a vertical direction, and the icon 730 and the menu name 740 are arranged in a horizontal direction. In this implementation, the user can select a specific menu while viewing the standby screen 300 without entering a separate menu screen.

In an "Ez service" menu, which is a menu positioned at a top position in the basic setting menu list 720, a cursor 750 for selecting a specific menu is positioned and an arrow 760 indicating a right direction is displayed. By moving the cursor 750 to a desired menu through manipulating the upward direction key 32 and the downward direction key 36 of the key input device 30, the user can select a corresponding menu.

If the user presses the rightward direction key 34 or the confirmation key 31 after moving the cursor 750 to one menu of the basic setting menu list 720 shown in FIG. 7B, a width of the basic setting menu list 720 is reduced, as shown in FIG. 7C, and sub-menus 730 of the selected menu are displayed in a transparent window form at the right side of the basic setting menu list 720.

In this case, while the sub-menu 730 is displayed, a width of the basic setting menu list 720 is reduced and icons related to the basic setting menu list 720 are displayed. In more detail, the menu name disappears in the basic setting menu list 720, and the icon 730 corresponding to the selected menu is highlighted, and thus it can be seen that a corresponding menu item is selected.

In this implementation, when the standby screen 300 is displayed, if the user selects the leftward direction key 38, a setting menu of the mobile communication terminal 100 is transparently displayed on the standby screen 300, for example. Therefore, the user can interact with the setting menu while viewing a standby screen in a standby state.

Further, in this implementation, by reducing the width of the basic setting menu list 720, a space for displaying the sub-menu 730 on the standby screen 300 can be secured.

In the above-described implementation, menus corresponding to a direction selected by the user are transparently displayed on the standby screen 300. Please note, however that this is an illustration, and menus displayed on the standby screen 300 can be embodied in a translucent form or an opaque form, depending on implementation In one embodiment, as a menu corresponding to a direction is selected by the user, a menu related to an icon displayed in the indicator area 320, a 'my menu' set by the user, a communication service provider additional service menu, and a basic setting menu are displayed. Please note however that this is an exemplary illustration, and various menus can be displayed, depending on implementation.

In one embodiment, the user selects a specific direction using four direction keys provided in the key input device 30. Please note however that the invention is not limited thereto, and the user can select a direction using any input device that can select a direction, such as an upper and lower direction side key, an 8-way navigation key, a joy stick, a touch pad, a touch screen, etc. That is, if the input device has a function of selecting a direction, the input device can be applied to the implementation regardless of the form or quantity.

Figure 8A:
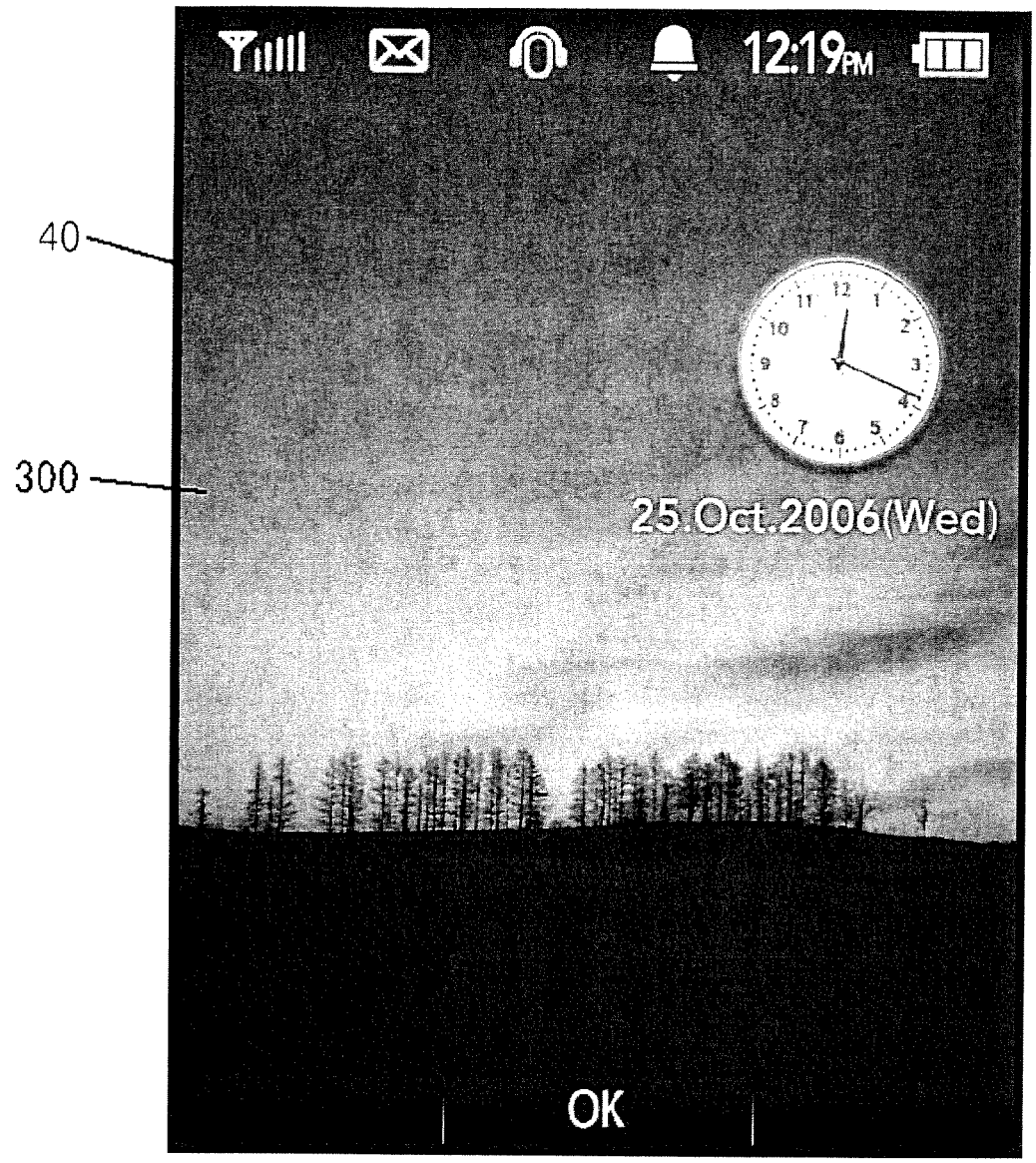
FIGS. 8A to 8C illustrate screens for explaining a method of displaying a menu in a mobile communication terminal in accordance with another implementation.
Figure 8B:
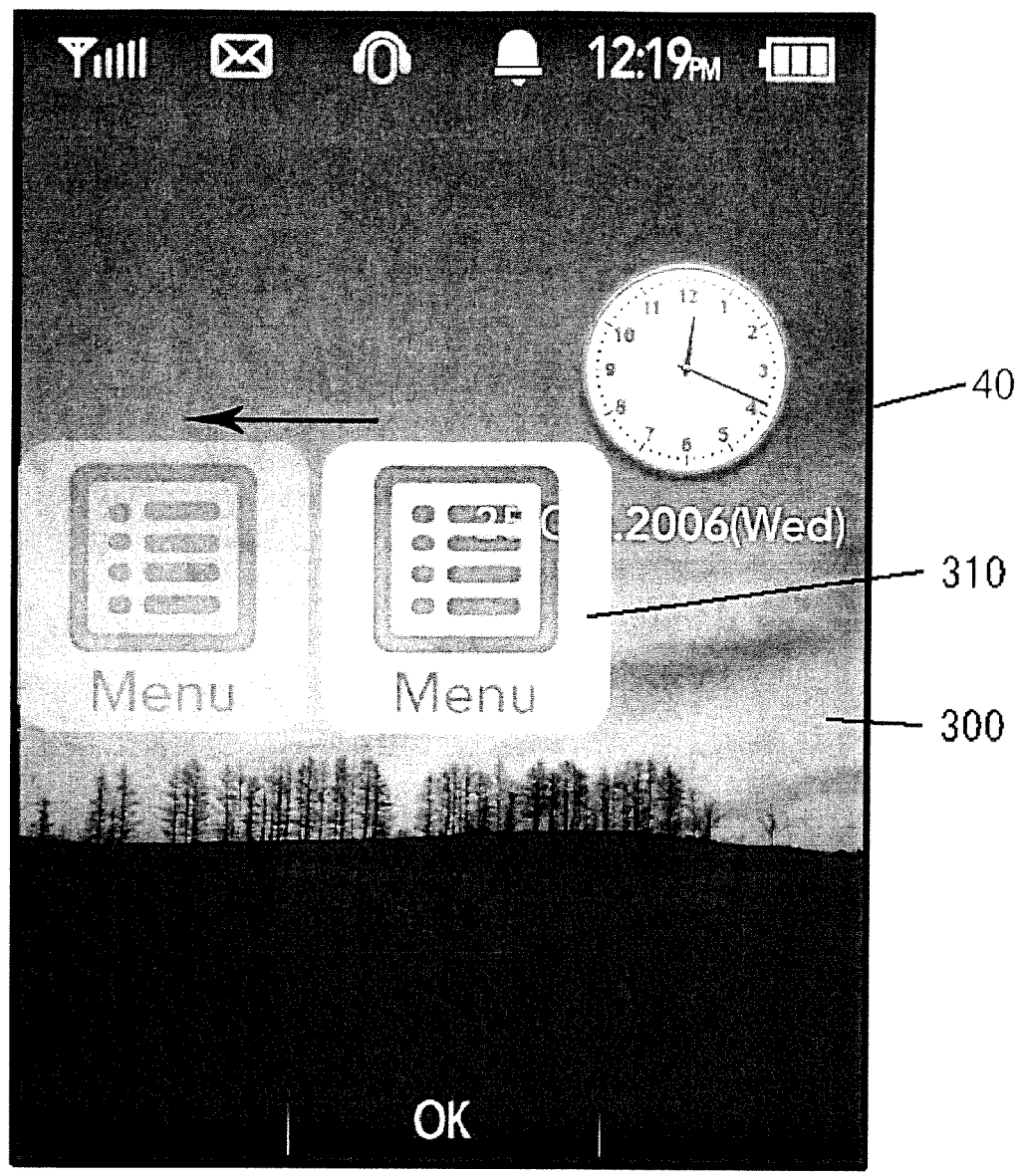
Figure 8C:
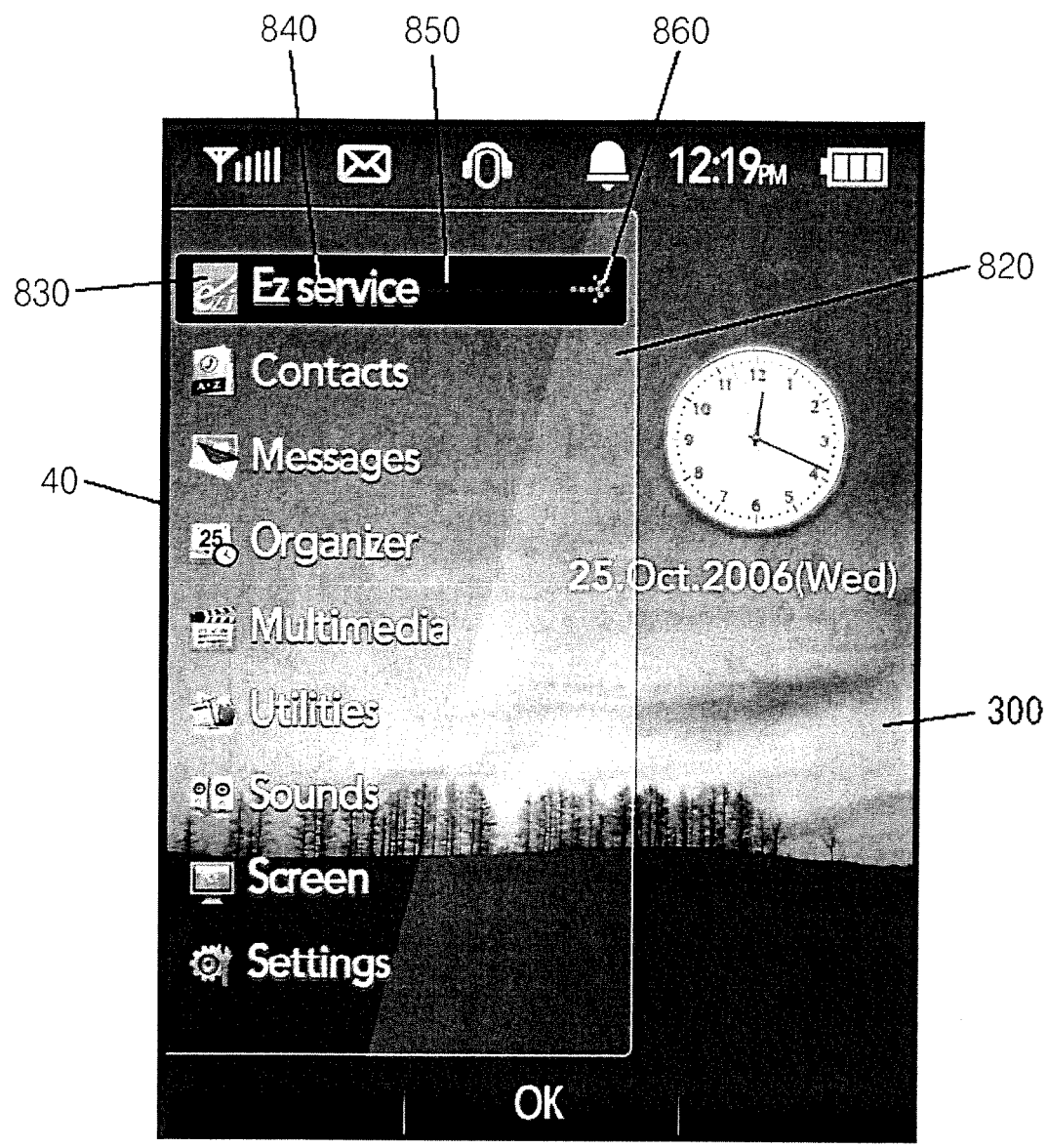

FIGS. 8A to 8C illustrate screens for explaining a method of displaying a menu in a mobile communication terminal in another implementation.

Referring to FIG. 8A, the standby screen 300 set by the user is displayed in the display 40.

If the user selects the leftward direction key 38 of four direction keys provided in the key input device 30, the icon 310 corresponding to an icon displayed in the leftward direction key 38 disappears on the standby screen 300 while moving to a left direction after being displayed around the center of the standby screen 300, as shown in FIG. 8B.

Thereafter, a basic setting menu list 820 of the mobile communication terminal 100 shown in FIG. 8C is displayed in a left area of the standby screen 300. The basic setting menu list 820 comprises a plurality of menus, and each menu comprises an icon 830 and a menu name 840 corresponding thereto. A plurality of menus constituting the basic setting menu list 820 is arranged in a vertical direction, and the icon 830 and the menu name 840 are arranged in a horizontal direction.

A cursor 850 is positioned at one (e.g. Ez service menu) of menus of the basic setting menu list 820, and an arrow 860 indicating a right direction is displayed. The user can vertically move the cursor 850 by manipulating the upward direction key 32 and the downward direction key 36 of the key input device 30.

That is, by manipulating the upward direction key 32 or the downward direction key 36, the user can move the cursor 850 to a desired menu and thus a corresponding menu can be selected.

Figure 9A:
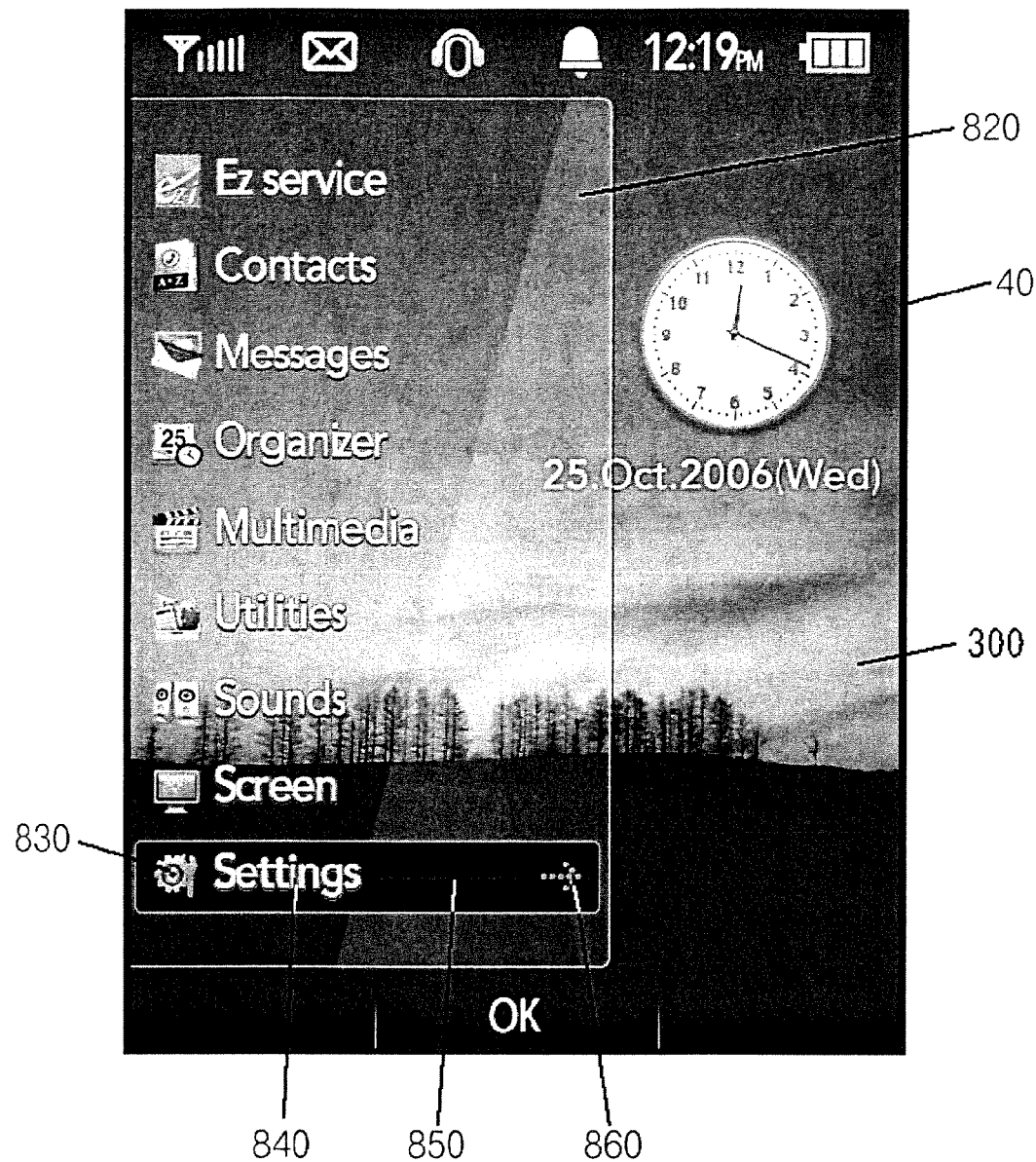
FIG. 9A illustrates an example of a screen in which a cursor is moved to a specific menu (e.g. a setting menu) as a user manipulates a direction key on the screen of FIG. 8C.

FIG. 9A illustrates an example of a screen in which a cursor 850 is moved to a specific menu (e.g. a setting menu) when the user manipulates a direction key on the screen shown in FIG. 8C.

When the cursor 850 is moved to the specific menu, if the user presses the leftward direction key 38 or a termination key, the basic setting menu list 820 disappears, and the screen returns to an initial standby screen state shown in FIG. 8A.

Figure 9B:
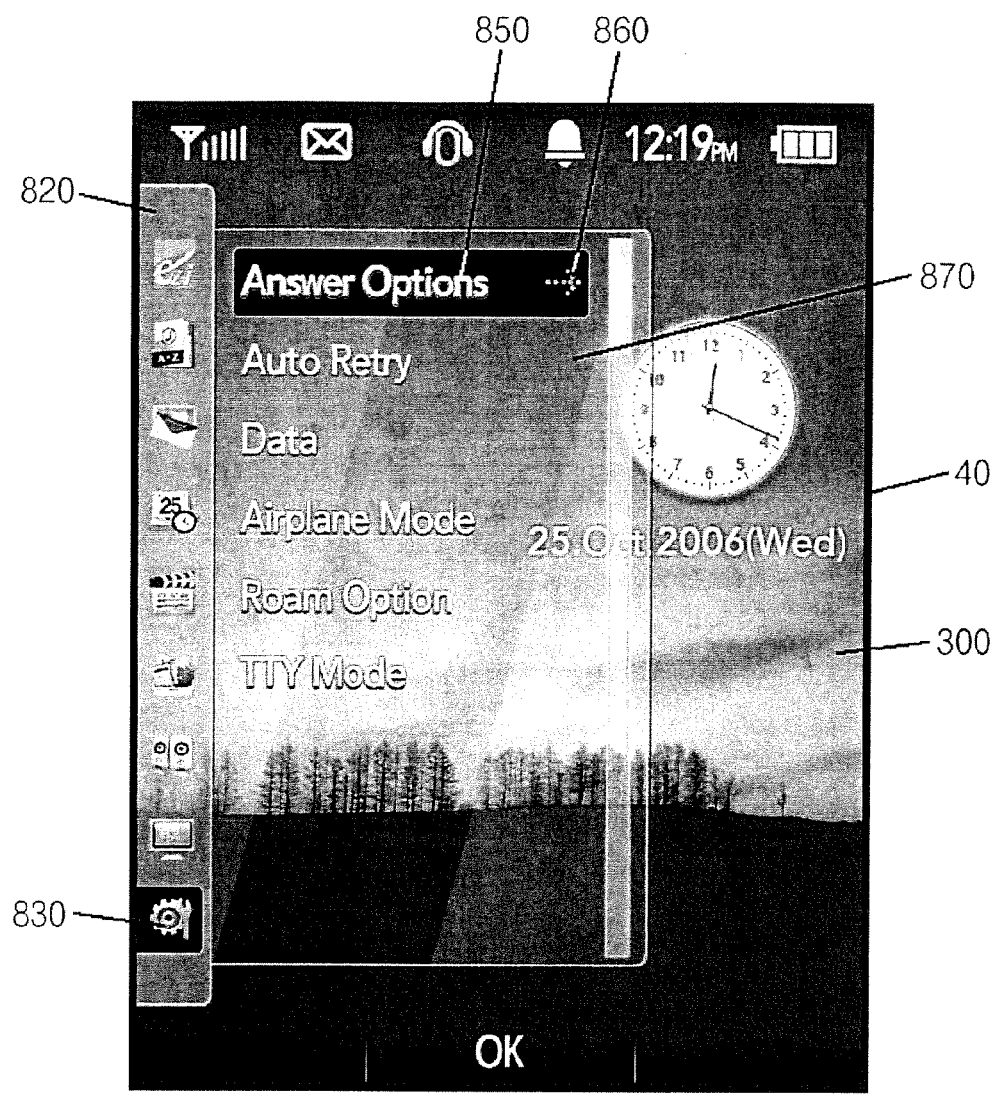
FIG. 9B illustrates an example of a case where a user presses a rightward direction key or a confirmation key of an input device in a state where a cursor is moved to a specific menu.

FIG. 9B illustrates an example of a case where a user presses a rightward direction key 34 or a confirmation key 31 of the key input device 30 in a state where a cursor is moved to a specific menu, as in FIG. 9A.

As shown in FIG. 9A, when the cursor is moved to a setting menu, if the user presses the rightward direction key 34 or the confirmation key 31, a width of the basic setting menu list 820 reduces, and a sub-menu 870 of the setting menu is displayed at the right side of the basic setting menu list 820, as shown in FIG. 9B.

In more detail, when the menu name 840 disappears in the basic setting menu list 820, and the icon 830 corresponding to the selected setting menu is highlighted, it can be seen that a corresponding menu is selected.

By reducing and displaying a width of the basic setting menu list 820, a space for displaying the sub-menu 870 on the standby screen 300 can be implemented.

Further, when the rightward direction key 34 corresponding to a direction of the arrow 860 is pressed, a specific menu is selected and a sub-menu of the selected menu is displayed, whereby a menu interface is provided to the user.

When the sub-menu 870 is displayed, as in FIG. 9B, if the user presses the leftward direction key 38 or the termination key, the screen returns to a previous state as shown in FIG. 8C or returns to an initial standby screen, as shown in FIG. 8A.

Further, when the sub-menu is displayed, as in FIG. 9B, if the user presses the leftward direction key 38 or the termination key, the sub-menu 870 may disappear in the standby screen 300 and the basic setting menu list 820 may be displayed.

Figure 9C:
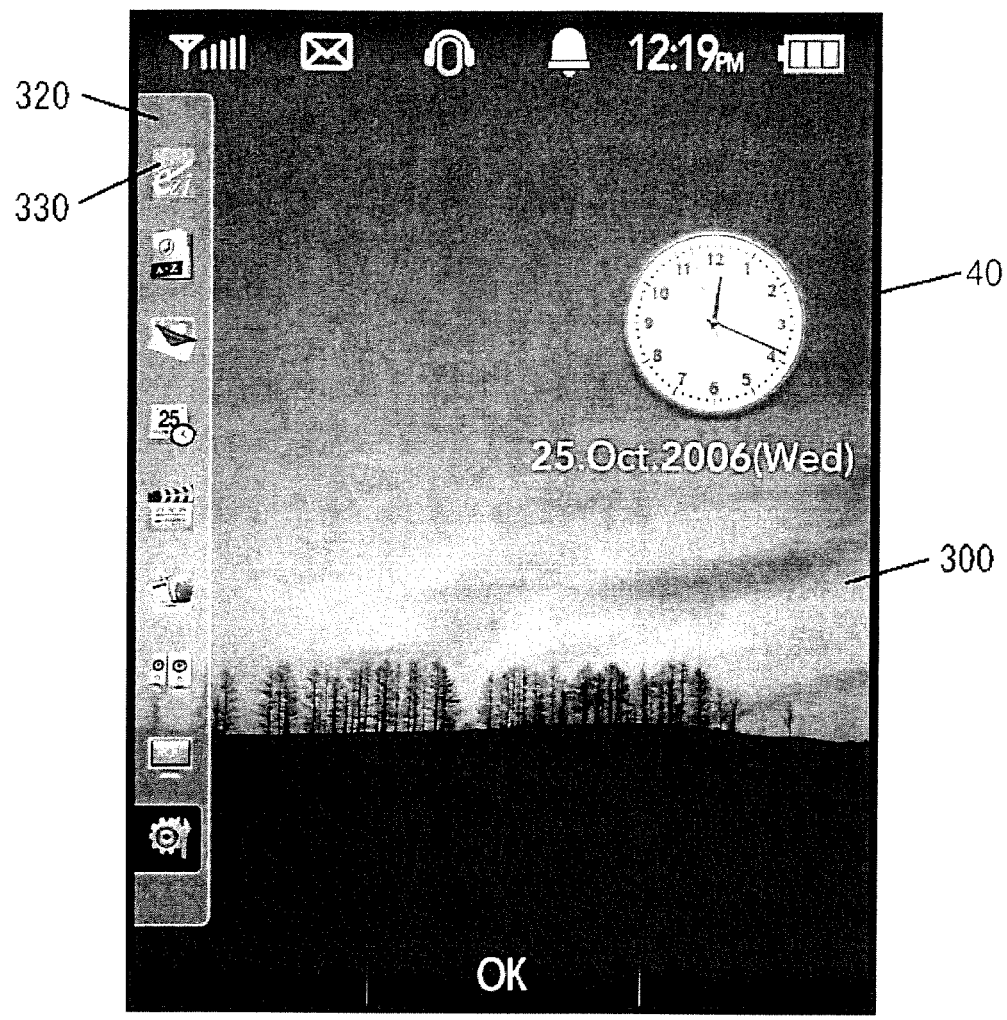
FIG. 9C illustrates an example of a screen in which a sub-menu disappears when a user presses a leftward direction key or a termination key in a state where a sub-menu is displayed.

FIG. 9C illustrates an example of a screen in which a sub-menu disappears when a user presses a leftward direction key 38 or a termination key in a state where the sub-menu is displayed, as in FIG. 9B.

As described above, when the sub-menu 870 is displayed, if the user presses the leftward direction key 38, the screen returns to a previous state, where a menu interface is provided to the user.

Figure 10:
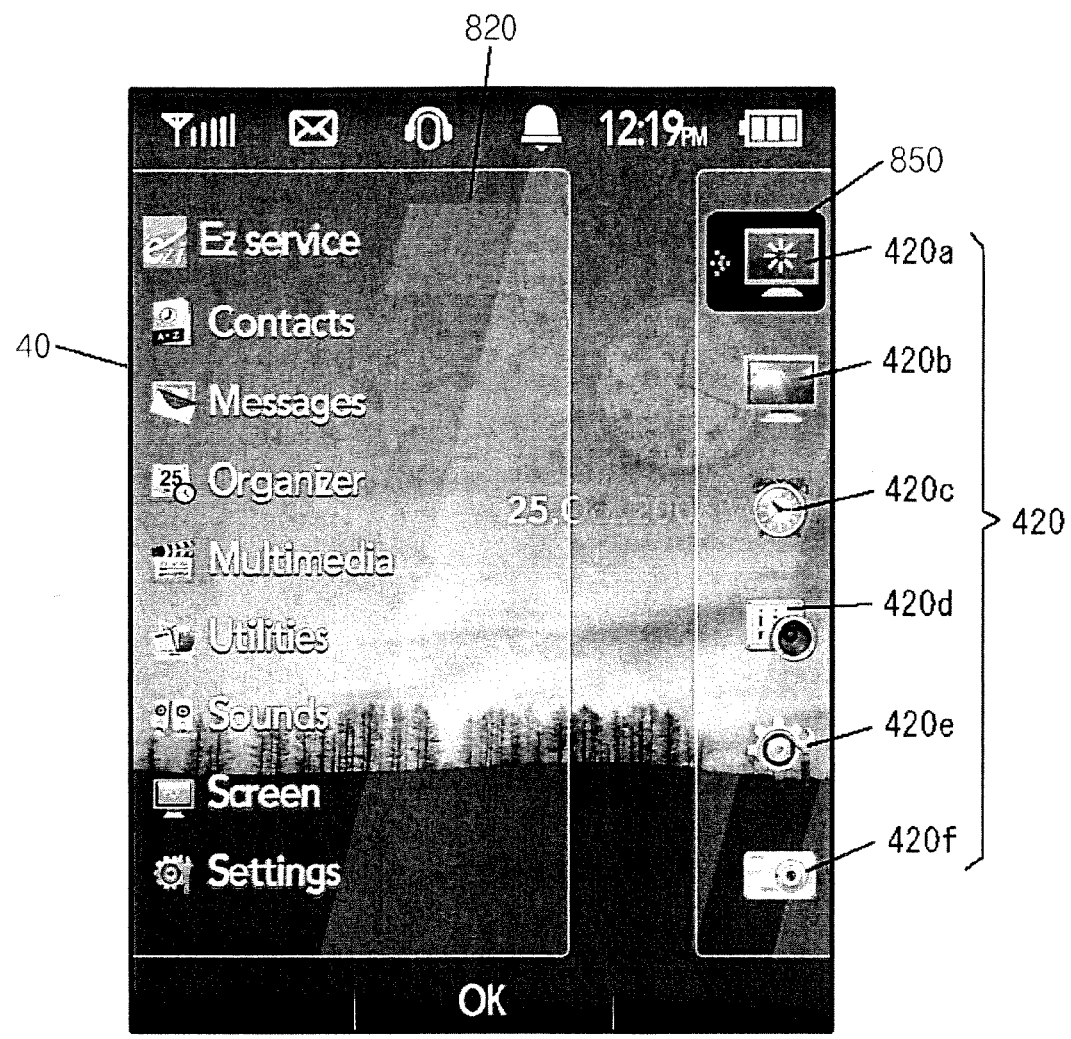
FIG. 10 illustrates an example of another screen displayed when a rightward direction key is selected in a state where a setting menu list is displayed on a standby screen.

FIG. 10 illustrates an example of another screen displayed when a rightward direction key 34 is selected in a state where a basic setting menu list 820 is displayed on a standby screen 300, as in FIG. 8C.

Referring to FIG. 10, when the basic setting menu list 820 of FIG. 8C is displayed, if the user presses the rightward direction key 34, the user setting menu 420 is displayed in a right area of the standby screen 300.

Further, the cursor 850 positioned at a menu item of the basic setting menu list 820 is moved to the first menu 420*a* of the user setting menu 420. As the cursor 850 is moved to the user setting menu 420, the user can select one of the user setting menu 420 by manipulating the upward direction key 32 or the downward direction key 36.

Further, when the cursor 850 is positioned at the first menu 420*a* of the user setting menu 420, as in FIG. 10, if the user presses the upward direction key 32, the cursor 850 is moved to the camera menu 420*f*, for example, positioned at the bottom of the user setting menu 420 or to a setting menu positioned at the end of the basic setting menu list 820.

In an implementation, when the user first selects the leftward direction key 38 on the standby screen 300, the basic setting menu list 820 is displayed in the left area of the standby screen 300. Please note however that the above-described implementations can be equally applied to a case where the user setting menu 420 is displayed in the right area of the standby screen 300 as the user selects the rightward direction key 34 in a standby screen 300.

Figure 11:
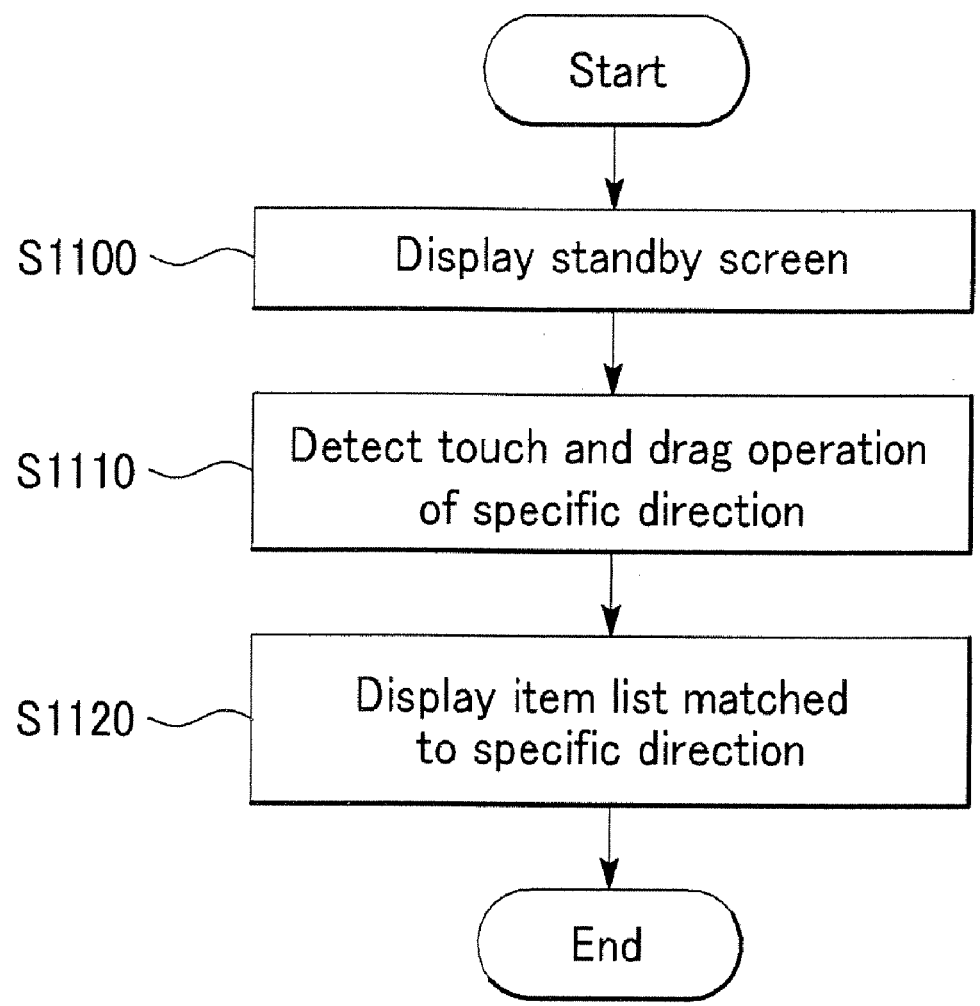
FIG. 11 is a flowchart illustrating a method of displaying a menu in a mobile communication terminal having a touch input device according with one implementation.

FIG. 11 is a flowchart illustrating a method of displaying a menu in a mobile communication terminal having a touch input device. Hereinafter, it is assumed that the touch input device 10 is a touch screen 10.

The controller 50 controls to display the standby screen 300 in the display 40 of the mobile communication terminal 100 (S1100).

Figure 12:
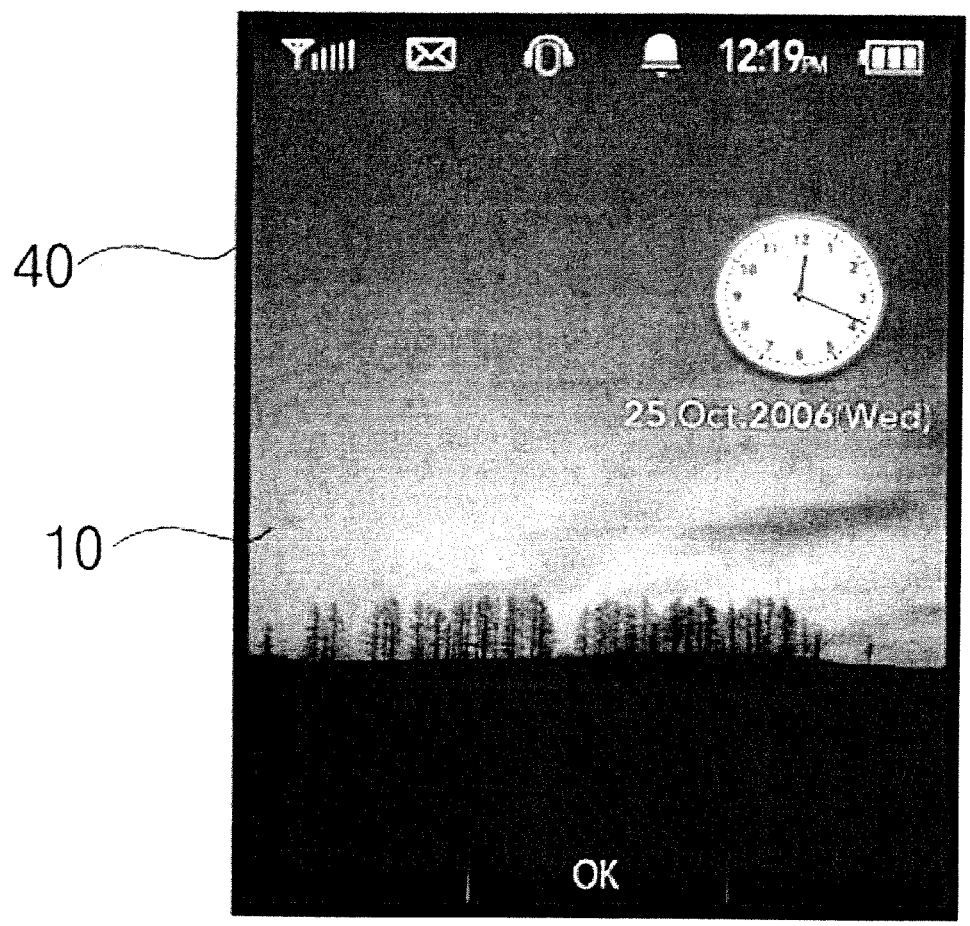
FIG. 12 illustrates an example of a standby screen displayed on a mobile communication terminal.

FIG. 12 illustrates an example in which a standby screen is displayed in a display of a mobile communication terminal.

The controller 50 detects a touch and drag operation of a specific direction on the touch screen 10 (S1110). The touch and drag operation indicates movement of an external object on the touch screen 10.

As the touch and drag operation is detected, the controller 50 controls to display an item list matched to the specific direction in the display 40 (S1120). The item list comprises, for example, a menu list or a file list. The memory 20 stores matching information between the specific direction and the item list. The memory 20 can store at least one matching information. For example, a menu list A comprising menu a, menu b, menu c, and menu d may be matched to a right direction. Further, for example, a menu list B comprising menu e, menu f, menu g, menu h, and menu i may be matched to a left direction.

The controller 50 controls to perform step S1120 using the matching information stored in the memory 20. The user can set the matching information. For example, the user can set a menu list having a plurality of specific menus to a right direction.

Figure 13:
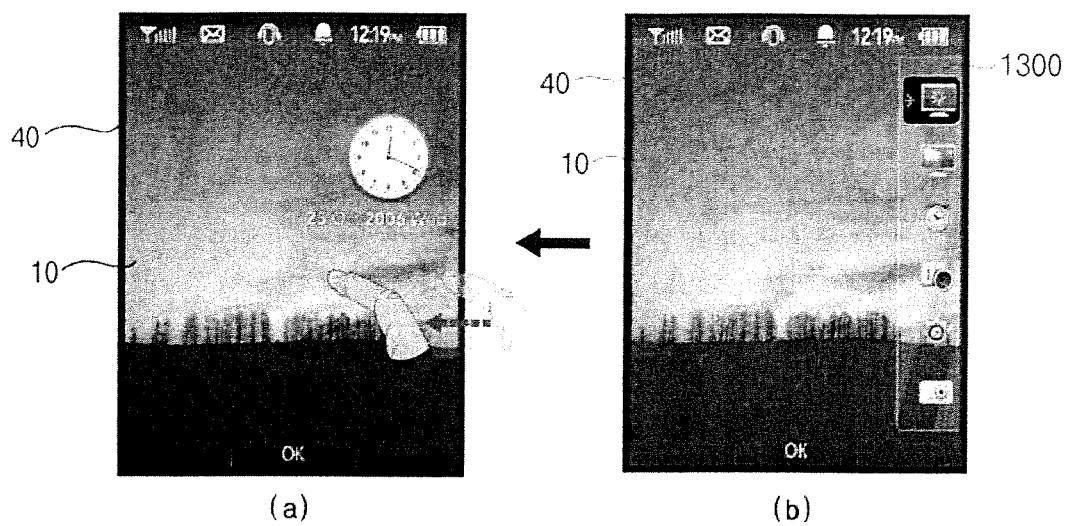
FIGS. 13 to 15 illustrate an example of a screen for displaying a menu list according to a touch and drag operation of a specific direction.
Figure 14:
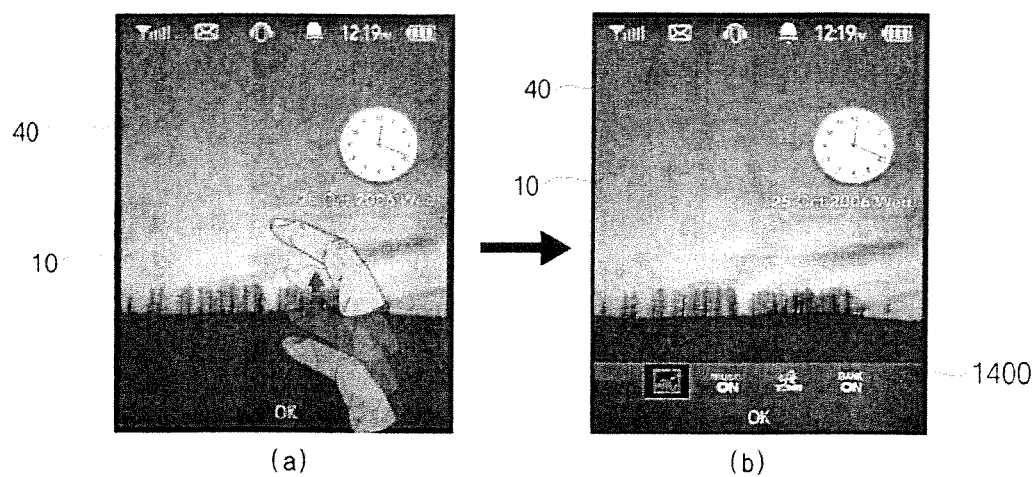
Figure 15:
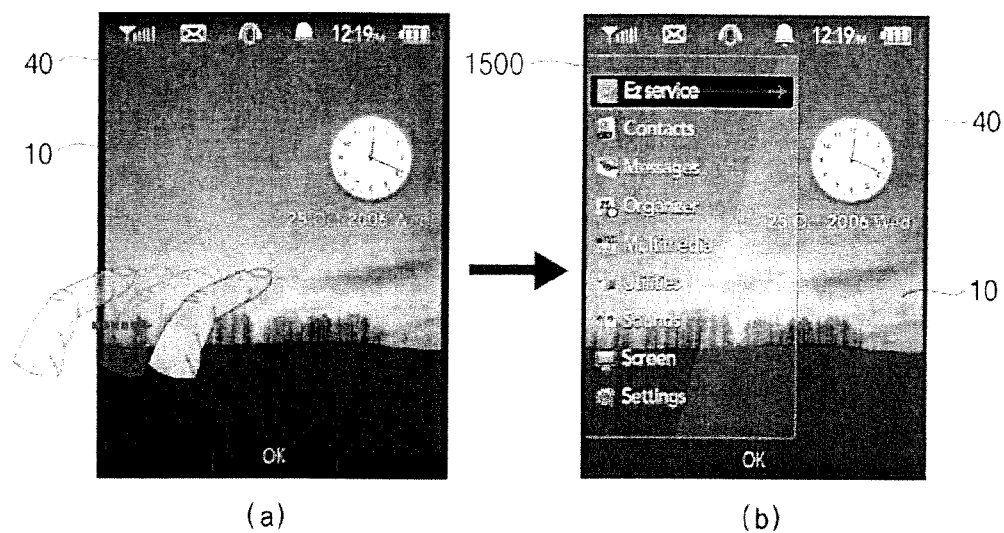

FIGS. 13 to 15 illustrate an example of a screen for displaying a menu list according to a touch and drag operation of a specific direction.

For example, referring to FIGS. 13*a* and *b*, if the user touches a specific position of the touch screen 10 and drags the touch in a left direction a menu list 1300 matched to a left direction is displayed in the display 40.

Further, for example, referring to FIGS. 14*a* and *b*, if the user touches screen 10 and drags the touch in an upward direction, a menu list 1400 matched to the upward direction is displayed in the display 40. Further, for example, referring to FIGS. 15*a* and *b*, if the user touches screen 10 and drags the touch in a rightward direction, a menu list 1500 matched to a right direction is displayed in the display 40.

A position in which the item list is displayed in the display 40 can be preset. For example, referring to FIGS. 13 to 15, a menu list matched to a left direction is set to be displayed at the right side of the display 40 (FIG. 13(*b*)), a menu list matched to a upward direction is set to be displayed at a lower end of the display 40 (FIG. 14(*b*)), a menu list matched to a right direction is set to be displayed at the left side of the display 40 (FIG. 15(b)). The memory 20 can store information about a position in which the item list is displayed.

Figure 16:
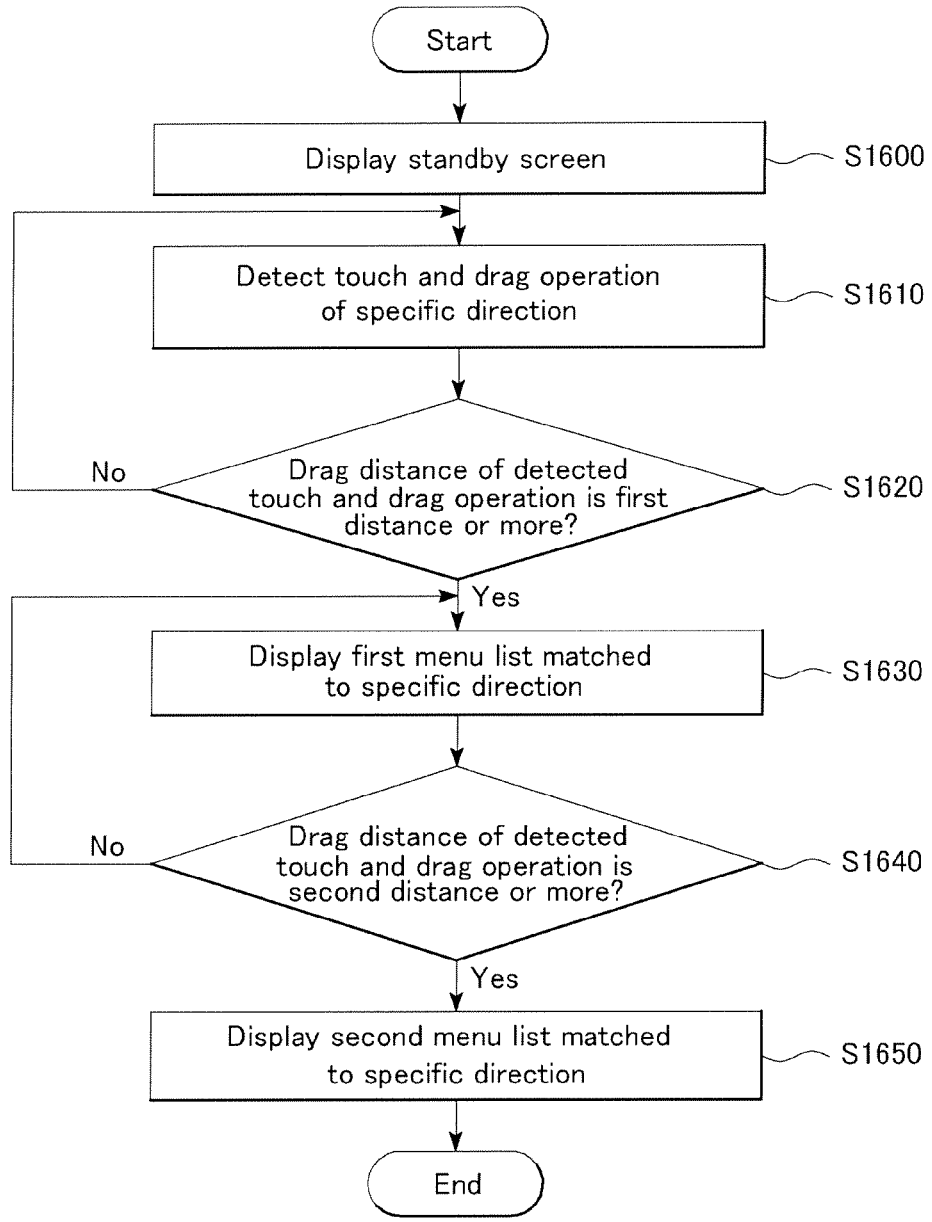
FIG. 16 is a flowchart illustrating a method of displaying a menu in a mobile communication terminal having a touch input device according to another implementation.

FIG. 16 is a flowchart illustrating a method of displaying a menu in a mobile communication terminal having a touch input device in another implementation. In this implementation, it is assumed that the touch input device 10 is a touch screen 10.

The controller 50 controls to display the standby screen 300 in the display 40 of the mobile communication terminal 100 (S1600). Step S1600 corresponds to step S1100 of FIG. 11.

The controller 50 detects a touch and drag operation of a specific direction in the touch screen 10 (S1610). Step S1610 corresponds to step S1110 of FIG. 11.

The controller 50 controls to sequentially display a plurality of specific menu lists according to a distance of the detected touch and drag operation.

The controller 50 determines whether a drag distance of the detected touch and drag operation is a first distance or more (S1620). If a drag distance of the detected touch and drag operation is a first distance or more, the controller 50 controls to display a first menu list matched to the specific direction (S1630).

The controller 50 determines whether a drag distance of the detected touch and drag operation is a second distance or more (S1640). If a drag distance of the detected touch and drag operation is a second distance or more, the controller 50 controls to display a second menu list matched to the specific direction (S1650). The second distance is longer than the first distance.

Figure 17:
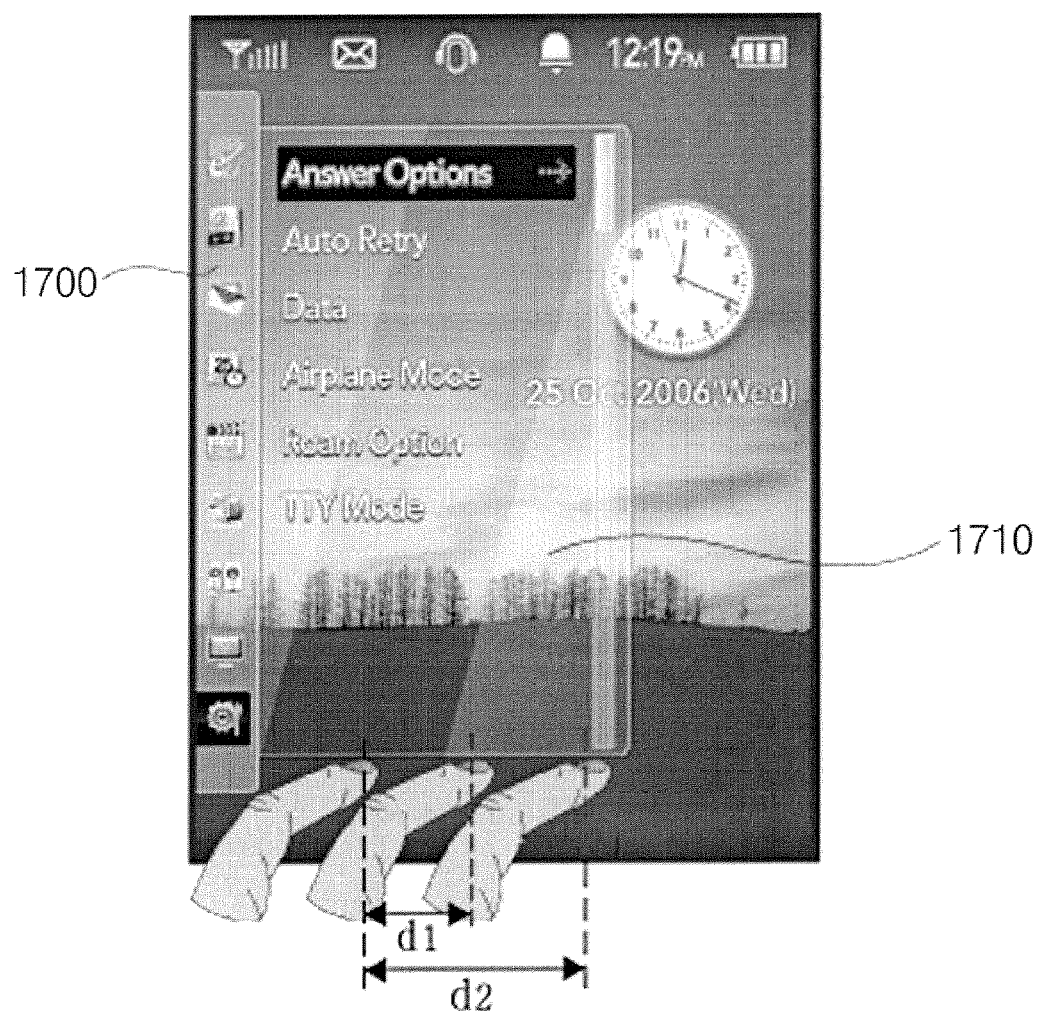
FIG. 17 illustrates an example of a screen for displaying a plurality of menu lists according to a drag distance in a touch operation.

FIG. 17 illustrates an example of a screen for displaying a plurality of menu lists according to a drag distance of a touch operation. For example, if a drag distance of the detected touch and drag operation reaches a distance d1, the controller 50 controls to display a first menu list 1700 in the display 40. If a touch operation dragged by the distance d1 reaches a distance d2, the controller 50 controls to display a second menu list 1710 in the display 40.

As shown in FIG. 17, the second menu list 1710 may be displayed together with the first menu list 1700. For example, when a drag distance of the touch operation reaches the distance d1, the first menu list 1700 is displayed. If the drag distance of the touch operation reaches the distance d2, the first menu list 1700 disappears and the second menu list 1710 may be displayed.

The first menu list 1700 and the second menu list 1710 may be included in the same menu. In this case, the first menu list 1700 and the second menu list 1710 can comprise different identifiers displaying the same menu. For example, the first menu list may comprise menus displayed with an icon, and the second menu list may comprise menus displayed with a text.

Further, the first menu list 1700 and the second menu list 1710 may comprise different menus.

In the above-described implementation, only a case where the first menu list 1700 and the second menu list 1710 are displayed according to a drag distance of a touch operation is displayed, however this implementation is not to be construed as limiting the scope of the invention to the disclosed exemplary embodiments. That is, in other implementation, a plurality of menu lists can be sequentially displayed according to a drag distance of the touch operation.

For example, the controller 50 controls to display a different specific menu list in the display 40 according to a distance of the touch and drag operation. Referring to FIG. 17, if the user drags the touch screen 10 by a distance longer than or equal to the distance d1 and shorter than the distance d2, the first menu list 1700 is displayed, and if the user drags the touch screen 10 by a distance longer than or equal to the distance d2, the second menu list 1710 is displayed. In this case, if the user drags by the distance d2 or more, the first menu list 1700 is not displayed. That is, if the touch and drag operation of the user is completed, the controller 50 determines a distance of the touch and drag operation, whereby a specific menu list corresponding to the distance can be displayed in the display 40.

In the above-described implementations, if the touch and drag operation of a specific direction is performed in the touch input device 10, an identifier for notifying the user that an item list matched to the specific direction is displayed in the display 40 can be displayed in the display 40. The identifier may be graphical in form, such as an icon. For example, the identifier may be a specific icon for notifying a start position of the touch and drag operation.

Figure 18:
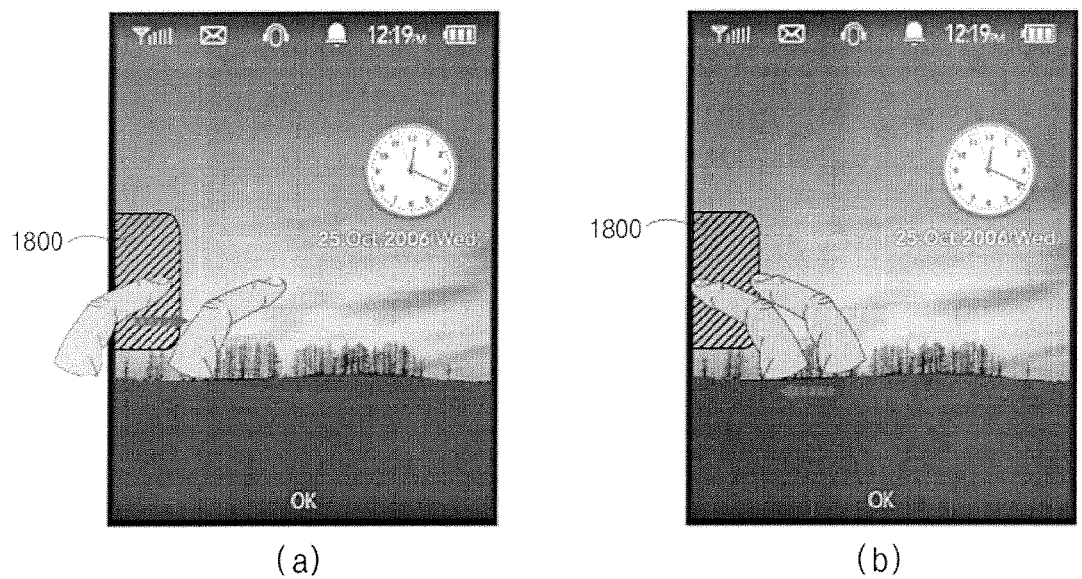
FIG. 18 illustrates an example of a screen for indicating a start position for a touch and drag operation to a user.

FIG. 18 illustrates an example of a screen for displaying a graphical display for notifying a start position of a touch and drag operation to a user. For example, referring to FIG. 18(a), if the user drags in a right direction after touching the screen, a graphical shadow 1800 is displayed in the display 40, and the menu list 1500 shown in FIG. 15(b) can be displayed in the display 40. In this case, as the user drags the graphic shadow 1800, the menu list 1500 can be displayed along the dragged graphic 1800.

Further, for example, referring to FIG. 18(b), if the user touch drags to the left, the menu list 1500 shown in FIG. 15(b) can be displayed in the display 40. In this case, as the user may press the graphic 1800 with a finger, the graphic 1800 gradually disappears in the display 40, and the menu list 1500 can be displayed as emerging from the left side of the display 40 while the graphic 1800 disappears in the display 40.

Other features will be apparent from the description and drawings, and from the claims.

What is claimed is:

1. A method of displaying a menu in a mobile communication terminal, the method comprising:
    displaying a standby screen as a first display layer on a touch input device of the terminal;
    detecting a touch and drag operation in a specific direction on the standby screen, the touch and drag operation comprising a touch operation received at a side of the touch input device or an area near the side and a drag operation starting from the touched side or area;
    displaying a first menu, which was not initially displayed on the standby screen, as a second display layer at least partially over the first display layer in response to the drag operation, the first menu including a plurality of menu items and displayed according to the specific direction of the drag operation, wherein the first menu emerges slidingly from the side of the touch input device when the drag operation is extended to a first distance; and
    displaying a second menu, which was not initially displayed with the first menu and comprises a plurality of menu items, as the second display layer when the drag operation is extended to a second distance, wherein the second distance is greater than the first distance.

2. The method of claim 1, wherein the number of the displayed menu items increases as a distance of the drag operation increases.

3. The method of claim 2, wherein:
    displaying the first menu comprises sequentially displaying a plurality of identifiers each corresponding to at least one menu item in the first menu according to the distance of the drag operation, and each of the plurality of identifiers comprises an icon and text.

4. The method of claim 1, further comprising:
displaying a specific graphic object in response to the touch operation; and
displaying the first menu when the drag operation causes dragging of the specific graphic object.

5. The method of claim 1, wherein the touch input device is a touch screen or a touch pad.

6. The method of claim 1, further comprising:
displaying a second menu when the drag operation further comprises a drag input occurring over a distance, wherein displaying the first menu and displaying the second menu occurs sequentially such that both the first menu and the second menu are displayed when the displaying of the second menu follows the displaying of the first menu.

7. The method of claim 1, further comprising displaying the first menu with a reduced width in response to user selection of a menu item from the first menu.

8. The method of claim 1, wherein the first menu is displayed in response to the touch and drag operation in a predetermined region of the input device.

9. The method of claim 1, wherein a width of an area where the first menu is displayed is changeable according to the distance of the drag operation.

10. A displaying method in a mobile terminal, the method comprising:
displaying a standby screen as a first display layer on a touchscreen display;
displaying a first menu as a second display layer on the display in response to a touch and drag operation that is extended for a first distance in a predetermined region of the display, the first menu comprising a plurality of menu items, wherein the first menu appears slidingly from a side of the standby screen along a direction determined based on the touch and drag operation; and
displaying a second menu as the second display layer on the display in response to a touch and drag operation that is extended for a second distance,
wherein:
the second distance is greater than the first distance;
the first menu was not initially displayed on the standby screen and comprises a plurality of menu items; and
the second menu was not initially displayed with the first menu and comprises a plurality of menu items.

11. The method of claim 10, wherein:
the display includes a plurality of predetermined regions each associated with a different edge of the display; and
displaying the first menu, which was not displayed on the standby screen before the touch and drag operation, at an area of the display that is generally related to one of the plurality of edges of the display, the first menu appearing slidingly from the one of the plurality of edges.

12. The method of claim 11, wherein the touch and drag operation can be received at any of the plurality of predetermined regions, causing the displaying of a menu at any of a plurality of areas of the display which are each generally related to one of the plurality of edges of the display.

13. The method of claim 10, further comprising displaying the first menu with a reduced width in response to user selection of a menu item from the plurality of menu items of the first menu.

14. The method of claim 13, wherein the second menu is a submenu of the selected menu item from the plurality of menu items of the first menu.

15. A displaying method in a mobile terminal, the method comprising:
displaying a standby screen as a first display layer on a touchscreen display;
displaying a first menu as a second display layer on the display in response to a touch and drag operation that is dragged to a first distance from a point touched on the touchscreen display such that the first menu appears from a side of the touchscreen display and is slid along a direction determined based on the touch and drag operation; and displaying a second menu as the second display layer on the display in response to the touch and drag operation that is dragged to a second distance from the point touched on the touchscreen display,
wherein:
the second distance is greater than the first distance;
the first menu was not initially displayed on the standby screen and comprises a plurality of menu items; and
the second menu was not initially displayed with the first menu and comprises a plurality of menu items.

16. The method of claim 15, wherein the displaying of the first menu is terminated after the touch and drag operation exceeds the second distance.

17. The method of claim 15, wherein the displaying of the first menu is maintained after the touch and drag operation exceeds the second distance.

18. The method of claim 15, wherein each of the plurality of menu items of the first menu corresponds to a menu item of the plurality of menu items of the second menu.

19. The method of claim 15, wherein a highlighted item of the plurality of menu items of the first menu generally relates to all of the plurality of menu items of the second menu, such that the plurality of menu items of the second menu are submenu items of the highlighted item of the first menu.

20. The method of claim 1, wherein the first menu is transparently displayed over the standby screen.

* * * * *